(12) United States Patent
Neumann et al.

(10) Patent No.: US 7,905,252 B2
(45) Date of Patent: Mar. 15, 2011

(54) APPARATUS AND METHODS TO DISPENSE FLUID FROM A BANK OF CONTAINERS AND TO REFILL SAME

(75) Inventors: Eric W. Neumann, Princeton, MN (US); Todd W. Larsen, Milaca, MN (US)

(73) Assignee: TESCOM Corporation, Elk River, MN (US)

( * ) Notice: Subject to any disclaimer, the term of this patent is extended or adjusted under 35 U.S.C. 154(b) by 480 days.

(21) Appl. No.: 12/136,188

(22) Filed: Jun. 10, 2008

(65) Prior Publication Data

US 2008/0271796 A1    Nov. 6, 2008

Related U.S. Application Data

(63) Continuation-in-part of application No. 11/384,613, filed on Mar. 20, 2006, and a continuation-in-part of application No. PCT/US2007/004123, filed on Feb. 13, 2007.

(60) Provisional application No. 60/944,406, filed on Jun. 15, 2007.

(51) Int. Cl.
*F16K 11/22* (2006.01)
*F16K 15/00* (2006.01)

(52) U.S. Cl. ............ 137/606; 137/884; 137/512.4
(58) Field of Classification Search ............ 137/606, 137/512.4, 884, 263
See application file for complete search history.

(56) References Cited

U.S. PATENT DOCUMENTS 5,088,436 A * 2/1992 Stritmatter ............ 137/263
2007/0215209 A1   9/2007 Street et al.

FOREIGN PATENT DOCUMENTS

WO   WO-2007/033027   3/2007
WO   WO-2007/108876   9/2007

* cited by examiner

*Primary Examiner* — Kevin L Lee
(74) *Attorney, Agent, or Firm* — Marshall, Gerstein & Borun LLP

(57) ABSTRACT

A fluid dispensing system includes a manifold having a fluid outlet port to dispense fluid from a plurality of fluid supply containers. The system additionally includes a plurality of valves connected to the manifold for controlling the flow of fluid from the containers. The manifold and valves are configured such that all fluid flow connections are disposed within the manifold, thereby reducing and/or eliminating the amount of piping required external to the manifold. So configured, the valves include simple cartridge-type devices that are easily installed into and removed from the manifold.

18 Claims, 14 Drawing Sheets

FIG. 10B  FIG. 10C  FIG. 10D  FIG. 10E

APPARATUS AND METHODS TO DISPENSE FLUID FROM A BANK OF CONTAINERS AND TO REFILL SAME

CROSS-REFERENCE TO RELATED APPLICATIONS

This application is a continuation-in-part application of U.S. patent application Ser. No. 11/384,613, filed on Mar. 20, 2006, and a continuation-in-part application of international patent application no. PCT/US2007/004123, filed on Feb. 13, 2007, the entire contents of each of which are incorporated herein by reference. Additionally, the priority benefit of U.S. Provisional Patent Application No. 60/944,406, filed Jun. 15, 2007 is claimed, and the entire contents thereof are incorporated herein by reference.

FIELD OF THE DISCLOSURE

The present disclosure relates generally to fluid delivery devices and, more particularly, to apparatus and methods to dispense fluid from a bank of containers and to refill same.

BACKGROUND

Filling fluid containers such as, for example, containers to store oxygen, natural gas, propane, carbon dioxide, etc. can be accomplished in several ways. One known method involves storing large quantities of a fluid in, for example, a storage tanker and transporting smaller, mobile fluid containers to the storage tanker to fill the containers. Another known method involves storing a large quantity of fluid in a large mobile storage tanker (e.g., a storage tanker built on a trailer) and driving the mobile storage tanker to customer locations to offer on-site refilling services.

Users that frequently fill smaller, mobile containers often store large quantities of fluid locally. For example, a fire department may store oxygen within the fire department facility to enable on-site refilling of mobile oxygen tanks for firefighters. Similarly, natural gas dealers may store natural gas to refill smaller, customer fluid containers. A known method for on-site refilling involves storing fluid in a single relatively large fluid storage container and transferring fluid from the large storage container to a container to be filled (e.g., a relatively smaller, mobile container). However, in some cases, sufficient space may not be available to accommodate the relatively large single fluid container that is needed to provide adequate refilling services.

To address space constraints, a plurality of smaller storage containers may be used in combination with a fluid dispensing cascade system. A cascade system is typically implemented by connecting or fluidly coupling a plurality of fluid storage containers to a regulator via a plurality of sequence valves. Such cascade systems may be used to refill, for example, relatively small fluid containers with fluid from the storage containers. As the pressure in one of the storage containers becomes sufficiently depleted (e.g., during a refilling operation), a sequence valve enables delivery of stored fluid from another one of the storage containers having a relatively higher pressure. Known cascade systems often involve complex implementations requiring large amounts of fluid line to fluidly couple sequence valves and other components of the cascade system. As a result, assembling and disassembling known cascade systems for installation and maintenance purposes is time consuming and expensive.

SUMMARY

Example methods and apparatus disclosed herein may be used to dispense fluid from a bank of containers and to refill same. An example fluid dispensing system includes a manifold having a fluid outlet port to dispense fluid and a fluid valve engaged to the manifold. First and second fluid storage containers are coupled to the manifold. The fluid valve is configured to control a first fluid flow path between the second fluid storage container and the fluid outlet port.

In accordance with another example, a fluid valve may include a bonnet and a base coaxially coupled to the bonnet. The bonnet may include a bonnet cavity defining a bonnet inner surface, a bonnet outer surface, and a first pressure sensing passageway extending between the bonnet outer surface and the bonnet cavity. The base may include a base outer surface and a base cavity defining a base inner surface.

The base may also include a fluid inlet passageway extending between the base outer surface and the base cavity, a fluid outlet passageway extending between the base outer surface and the base cavity, and a second pressure sensing passageway extending between the base outer surface and the base cavity. A valve element within the base and bonnet cavities may be provided to control a fluid flow path through the fluid inlet passageway and the fluid outlet passageway.

In accordance with yet another example, a manifold may include a first cavity to receive a first fluid valve. The manifold may also include a first fluid inlet port to couple to a first fluid storage container and a second fluid inlet port to couple to a second fluid storage container. In addition, the manifold may include an outlet port that is configured to dispense fluid received via the first fluid inlet port and the second fluid inlet port.

In accordance with yet another example, a dual check valve device includes a housing and a first check valve in the housing. The dual check valve may also include a second check valve located in the housing adjacent the first check valve and in substantial axial alignment with the first check valve.

In accordance with still another example, the base may also include a fluid inlet passageway extending between the base outer surface and the base cavity, a fluid outlet passageway extending between the base outer surface and the base cavity, a first pressure sensing passageway extending between the base outer surface and the base cavity, and a second pressure sensing passageway extending between the base outer surface and the base cavity. A valve element within the base and bonnet cavities may be provided to control a fluid flow path through the fluid inlet passageway and the fluid outlet passageway. In accordance with such an example, the manifold may include a first fluid passageway in communication with the first pressure sensing passageway of the base and a second fluid passageway in communication with the second pressure sensing passageway of the base.

BRIEF DESCRIPTION OF THE DRAWINGS

FIG. 10A depicts an end view and FIGS. 10B-10E depict sectional views of the example manifold of FIGS. 5A-5C and 6-9;

DETAILED DESCRIPTION

Figure 1:
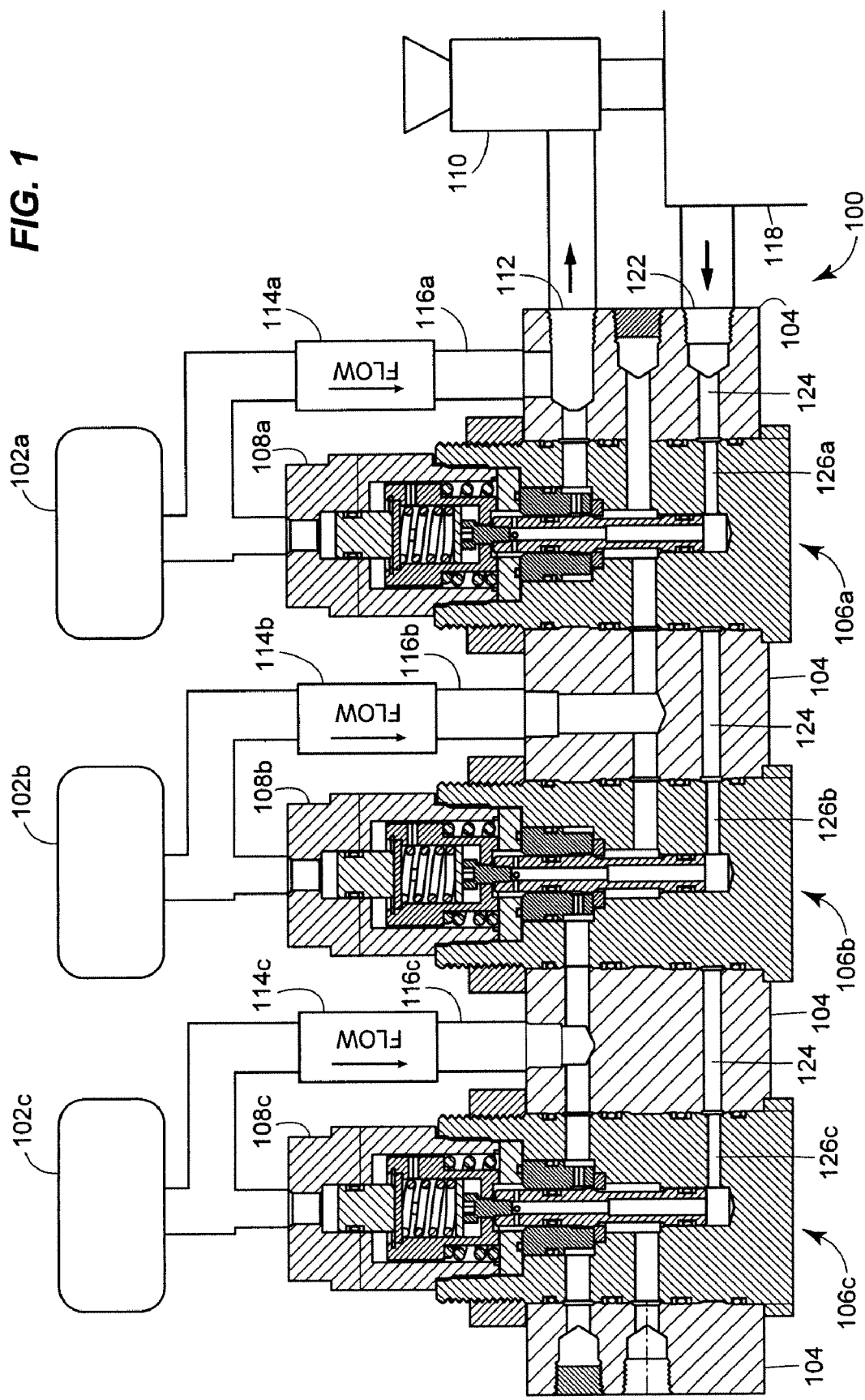
FIG. 1 depicts a cross-sectional view of an example cascade system that may be used to deliver fluid from a bank of fluid containers.

Example apparatus and methods disclosed herein may be used to dispense fluid from a bank of fluid containers and to refill the bank of fluid containers. Specifically, a bank of fluid containers may be connected to an example cascade system to dispense fluid from the containers in, for example, filling station applications. For example, the example cascade apparatus or systems described be low may be used to supply breathable oxygen, hydrogen, natural gas, carbon dioxide, or any other fluid. In an example implementation, to fill a container (e.g., a bottle, a tank, a fluid-depleting container, etc.), the container is fluidly coupled or connected to an example cascade system and a7/m2 is turned to enable fluid delivery from a first fluid storage container (e.g., a fluid storage container having the lowest pressure). As the pressure in the container being filled approaches the pressure the first storage container, the example cascade system automatically enables fluid flow from another storage container (e.g., a next in sequence container) having a relatively higher pressure than the first storage container to continue delivering fluid to the container being filled after the pressure in the container being filled exceeds the pressure the first storage container. In this manner, the cascade system automatically enables (e.g., opens) fluid delivery flow paths corresponding to subsequent relatively higher-pressure storage containers (e.g., in a sequential manner) to enable a substantially continuous fluid supply to the container being filled.

Unlike known cascade systems implemented using relatively large amounts of fluid line to couple a plurality of conventional sequence valves, the example cascade systems described herein are implemented using manifolds configured to receive and fluidly couple sequence valves, thereby substantially reducing and/or eliminating the number of fluid lines needed to couple the sequence valves and other components of the cascade system.

Reducing the amount of piping or fluid line reduces assembly time during installation and maintenance procedures. In addition, reducing the required amount of fluid line needed reduces the number of components that can wear, malfunction, or fail, which reduces the overall maintenance time and costs associated with the example cascade systems.

An example cascade system manifold described herein is a finite structure, the external geometry of which is defined by discrete external boundaries. For example, in the embodiments depicted in the attached drawings, the manifold resembles a rectangular block shape. The manifold includes a plurality of sequence valve openings (e.g., threaded openings, ports, receptacles, etc.), each of which is configured to receive a sequence valve that is, in turn, fluidly coupled to a respective fluid storage container. A plurality of fluid flow passageways or paths are formed in the manifold to couple inlet and outlet ports of the sequence valves to enable operation of the sequence valves and to deliver fluid from each storage container as the sequence valves automatically and sequentially control the flow paths by disabling (e.g., closing) and enabling (e.g., opening) the flow paths. Unlike known sequence valves having stand-alone configurations and requiring fluid lines to couple to other sequence valves, the example sequence valves described below are implemented using a cartridge-like body that plugs directly into, interfits with, or otherwise operatively engages a sequence valve opening of the manifold. As such, the sequence valves are in direct fluid communication with various flow paths defined by the manifold.

The example cascade systems described below also enable recharging (e.g., refilling, replenishing, etc.) the fluid in the bank of storage containers coupled thereto. To enable and control recharging of storage containers coupled to the example cascade systems described below, a recharge circuit is implemented to enable (e.g., open) a recharge flow path from a recharge container or a recharge fluid supply to each storage container. In some example implementations, the storage containers may be recharged without interfering with or interrupting the fluid delivery operation of the sequence valves. In this manner, the example cascade system may be used to deliver fluid from the bank of storage containers while simultaneously recharging the storage containers.

To further reduce the amount of fluid line required to implement the example cascade systems described below, an example manifold may include a check valve opening to directly receive a check valve (i.e., a unidirectional flow valve, a one-way flow valve, a valve to limit fluid flow to one direction, etc.) without requiring any intermediate coupling fluid line between the check valve and the manifold. In other words, the manifold directly receives the check valve. Unlike known check valves that require a fluid line to couple the check valve to another device (e.g., a sequence valve, a regulator, etc.), the example check valves described below have cartridge-like exteriors or cartridge-like bodies that plug into, interfit with, or otherwise operatively engage the check valve openings of the example manifold. A plurality of fluid passageways are formed in the example manifold to fluidly couple or connect the check valves to other components (e.g., sequence valves and/or other check valves) or portions of the manifold to enable the fluid delivery and recharge operations.

An example dual check valve cartridge described below includes two check valves in a single housing. Each check valve may operate independently so that each dual check valve cartridge may provide two functions. In particular, one of the check valves of the example dual check valve cartridge may be used to enable a fluid recharge flow to a storage container while the other check valve enables fluid delivery flow from the storage container.

Figure 2:
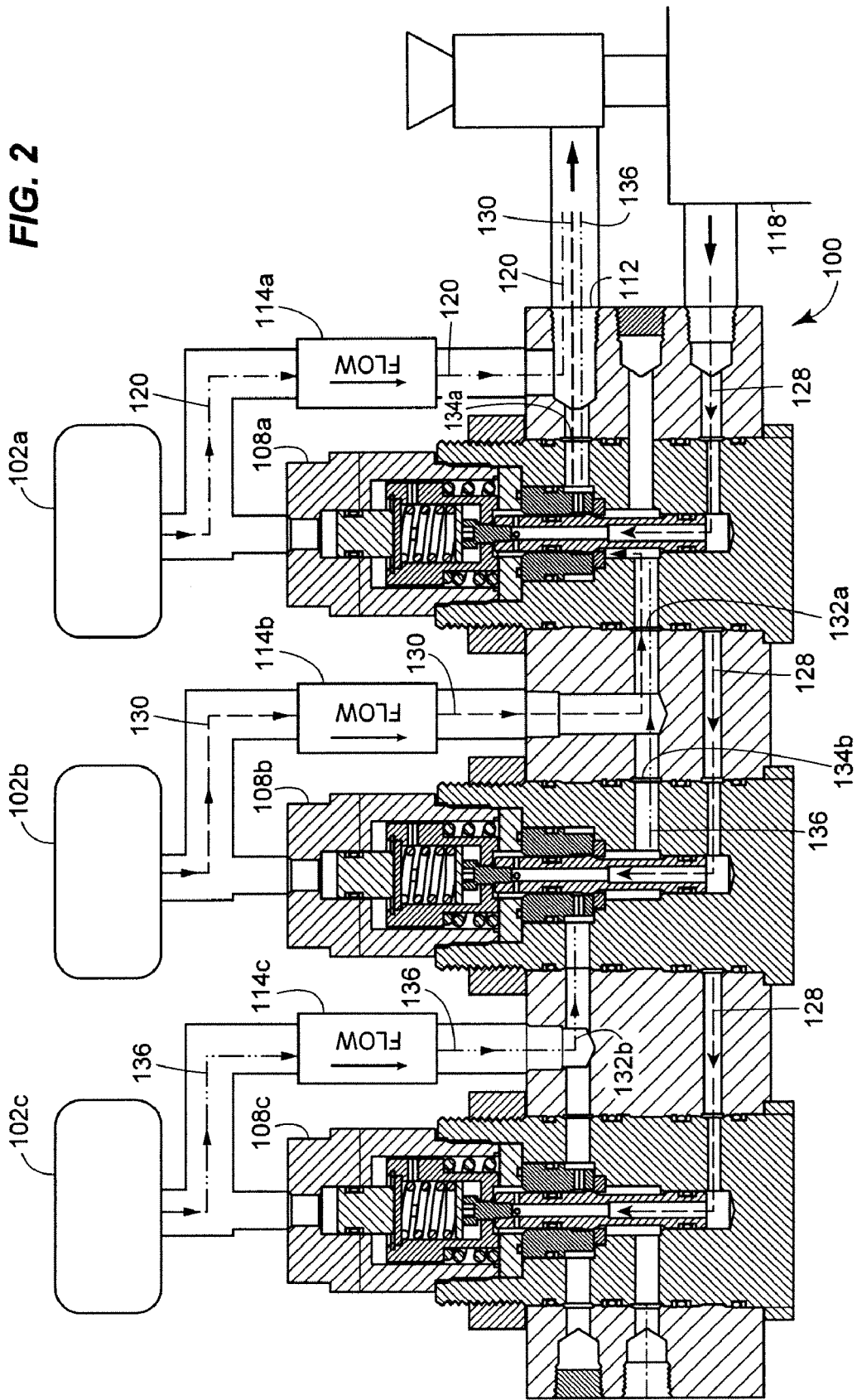
FIG. 2 depicts example fluid flow paths associated with the example cascade system of FIG. 1.

Now turning in detail to FIGS. 1 and 2, which illustrate cross-sectional views of an example cascade system 100 that may be used to deliver fluid (e.g., oxygen, natural gas, propane, hydrogen, etc.) from a bank of fluid storage containers 102a-c. The cascade system 100 includes a manifold 104 having a plurality of sequence stages 106a, 106b, and 106c. Each of the sequence stages 106a, 106b, and 106c includes a respective sequence valve 108a, 108b, and 108c coupled directly to the manifold 104, i.e., without any intervening fluid lines or piping. Each of the sequence valves 108a, 108b, and 108c is fluidly coupled to a respective one of the fluid storage containers 102a, 102b, and 102c. A regulator 110 is coupled to a manifold outlet port 112 to enable the filling of fluid containers (e.g., fluid-depleting containers, refillable containers, bottles, pressure vessels, etc.) with the fluid provided by the storage containers 102a-c.

Each of the storage containers 102a-c is coupled to the manifold 104 via a respective one of a plurality of check valves 114a, 114b, and 114c. The check valves 114a-c enable fluid flow in only one direction (e.g., fluid flow toward the manifold outlet port 112) and, thus, prevent fluid back-flow into the storage containers 102a-c from the manifold outlet port 112 or any other source. In the illustrated example, the check valves 114a-c are coupled to the manifold 104 via respective check valve fluid lines 116a-c. However, in other example implementations (e.g., the example cascade system 500 described below in connection with FIGS. 5A-5C and 6-9), manifolds (e.g., the manifold 504 of FIGS. 5A-5C and 6-9) may be configured to receive check valve cartridges (e.g., the dual check valve cartridges 512a-d of FIGS. 5B, 5C, 6 and 9) directly coupled thereto without any intervening fluid lines or piping to reduce the amount of required fluid line and to simplify assembly.

The example cascade system 100 enables the storage containers 102a-c to provide sufficient pressure to fill containers with the fluid stored in the fluid containers 102a-c. For example, to fill a container 118, the sequence valves 108a-c activate delivery from each of the fluid containers 102a-c in a sequential manner to ensure that the pressure output from the manifold 104 is sufficiently high relative to the pressure in the container 118 to enable filling of the container 118. During operation, after connecting the container 118 to the regulator 110, fluid is delivered from the first storage container 102a through the first stage check valve 114a to the manifold outlet port 112 via a first container fluid delivery path 120 (FIG. 2).

To detect the amount of pressure in the container 118, the container 118 is connected to or fluidly coupled to a pressure sensing port 122. The pressure sensing port 122 is coupled to a pressure sensing passageway 124 formed in the manifold 104. The pressure sensing passageway 124 connects to pressure sensing passageways 126a-c of each sequence valve 108a-c to form a pressure sensing flow path 128 (FIG. 2). The fluid pressure in the container 118 is coupled via the pressure sensing flow path 128 to enable each of the sequence valves 108a-c to sense the pressure in the container 118 during the filling process.

When the pressure in the container 118 rises to a particular level relative to the pressure in the first storage container 102a, the first sequence valve 108a automatically enables (e.g., opens) a second container fluid delivery path 130 (FIG. 2) between the second storage container 102b and the manifold outlet port 112. The second storage container 102b then begins delivering fluid to the container 118 via the second container fluid delivery path 130. In particular, as shown in FIG. 2, the fluid from the second storage container 102b flows through the second stage check valve 114b, a first stage inlet port 132a, the first sequence valve 108a, and out of a first stage outlet port 134a to the manifold outlet port 112. The first container fluid delivery flow path 120 is substantially disabled (e.g., closed) when the second fluid delivery flow path 130 is enabled, and the first sequence valve 108a and the first check flow valve 114a prevent the fluid from the second storage container 102b from flowing into the first storage container 102a.

When the pressure in the container 118 increases to a particular level relative to the pressure in the second storage container 102b, the second sequence valve 108b automatically enables a third container fluid delivery path 136 (FIG. 2) between the third storage container 102e and the manifold outlet port 112. The third storage container 102c then begins delivering fluid via the third container fluid delivery path 136. As shown in FIG. 2, the third container fluid delivery path 136 extends through the third stage check valve 114c, a second stage inlet port 132b, the second sequence valve 108b, a second stage outlet port 134b, the first stage inlet port 132a, the first sequence valve 108a, the first stage outlet port 134a, and out to the manifold outlet port 112.

In some example implementations, additional storage containers (e.g., a fourth storage container) (not shown) may be connected to the manifold 104. In this manner, the container 118 can be filled with a fluid pressure relatively higher than the fluid pressure of the third storage container 102e.

When fluid delivery is shut off via the regulator 110 and the container 118 is disconnected from the example cascade system 100, the sequence valves 108a-c disable the second and third container fluid delivery flow paths 136 and 130, thereby enabling the first container fluid delivery flow path 120 for any subsequent container to be filled that may be connected to the example cascade system 100.

Although the above-described process involves sequentially activating fluid delivery from three or four storage containers, if the desired pressure in the container 118 does not exceed a level for which the first storage container 102a cannot continue delivering fluid, then the container 118 may be filled without activating fluid delivery paths associated with the second or third storage containers 102b and 102c.

Figure 3:
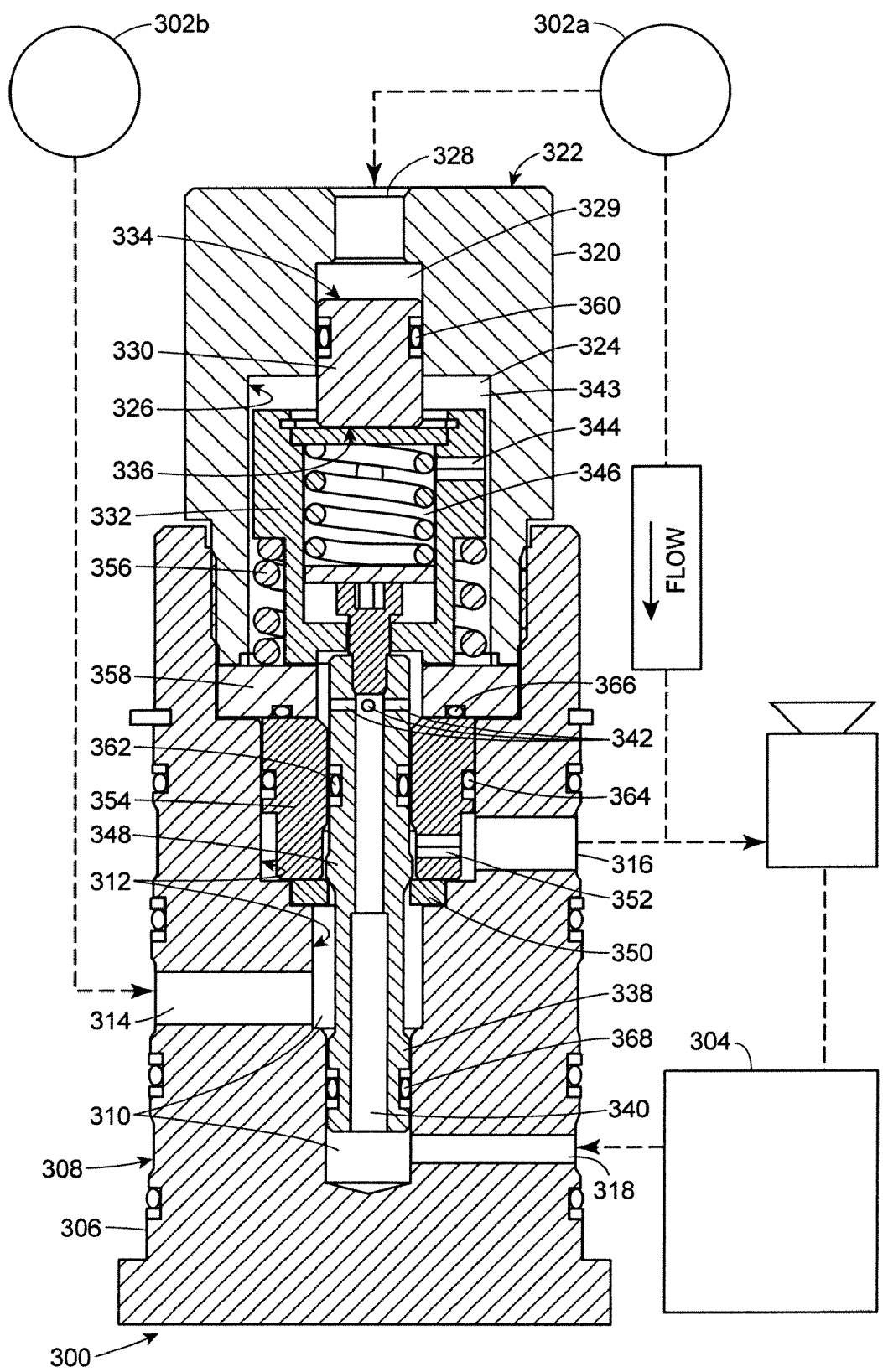
FIG. 3 depicts an example sequence valve that may be used to implement the example systems and methods described herein.

FIG. 3 depicts an example sequence valve 300 that may be used to implement the example sequence valves 108a-c described above in connection with the example cascade system 100 and example sequence valves described below in connection with other example cascade systems. The operation of the example sequence valve 300 is substantially similar or identical to the operations of the sequence valves 108a-c described above in connection with FIGS. 1 and 2. In the illustrated example, the sequence valve 300 is depicted as being coupled to a first fluid storage container 302a and a second fluid storage container 302b to enable filling a container 304 with fluid gored in the first and/or second storage containers 302a-b.

The example sequence valve 300 includes a base 306 having a base outer surface 308 and a base cavity 310 defining a base inner surface 31 to enable fluid flow between the second storage container 302b and the container 304, the base 306 includes a valve inlet passageway 314 (e.g., the inlet ports 132a-b of FIG. 2) and a valve outlet passageway 316 (e.g., the stage outlet ports 134a-b of FIG. 2). The valve inlet passageway 314 extends between the base outer surface 308 and the base inner surface 312 and provides a flow path (e.g., the second container fluid delivery path 130 of FIG. 2) to enable fluid to flow from the second storage container 302b of the base cavity 310. The valve outlet passageway 316 extends from the base cavity 310 to the base outer surface 308 and provides a flow path (e.g., the second container fluid delivery path 130) for the fluid from the second container 302b to flow from the base cavity 310 to the filling container 304.

To enable the sequence valve 300 to sense a fluid pressure in the container 304, the base 306 includes a filling pressure sensing passageway 318 (e.g., the pressure sensing passageways 126a-c of FIG. 1) extending between the base outer surface 308 and the base inner surface 312. The filling pressure sensing passageway 318 provides a path (e.g., the pressure sensing flow path 128 of FIG. 2 to enable fluid pressure to be coupled from the container 304 to the base cavity 310.

The example sequence valve 300 also includes a bonnet 320 via bonnet outer surface 322 and a bonnet cavity 324 defining a bonnet inner surface 326. To enable the example sequence valve 300 to sense a pressure in the first storage container 302a, the bonnet 320 includes a storage pressure sensing passageway 328 extending between the bonnet outer and inner surfaces 322 and 326. The storage pressure sensing passageway 328 enables the example sequence valve 300 to be connected to or coupled to the first storage container 302a and provides a fluid path from the first storage container 302a to a storage pressure chamber 329 of the bonnet cavity 324.

The base 306 is coupled to the bonnet 320 to form a pressure-tight seal and encapsulate a plurality of valve components. Specifically, the base 306 and the bonnet 320 encapsulate a piston 330 that is coupled to a spring retainer 332 and slidably and sealingly engaged with the bonnet cavity 324. The piston 330 has a storage pressure sensing surface 334 and a filling pressure sensing surface 336 opposing the storage pressure sensing surface 334. The pressure in the first storage container 302a applies a force to the storage pressure sensing surface 334 and the pressure in the container 304 applies a force to the filling pressure sensing surface 336.

To sense the pressure in the container 304, the example sequence valve 300 includes a valve stem 338 having a valve stem passageway 340 formed therethrough. The fluid pressure in the container 304 is coupled into the filling pressure sensing passageway 318, through the stem passageway 340, and through valve stem side ports 342 to fill a pressure chamber 343 of the bonnet cavity 324. The fluid pressure is also coupled through spring retainer side ports 344 to fill a spring retainer chamber 346 causing the pressure in the container 304 to apply a force to the filling pressure sensing surface 336 that opposes the force (e.g., the pressure of the first storage container 302a) applied against the storage pressure sensing surface 334. The example sequence valve 300 enables (e.g., opens) and disables (e.g., closes) a flow path (e.g., the second container fluid flow path 128 of FIG. 2) of the second storage container 302b to the container 304 based on the difference between the opposing forces that are applied to the pressure sensing surfaces 334 and 336.

To disable and enable the fluid pathway from the second storage container 302b, the valve stem 338 is provided with a plug portion 348. The valve stem 338 is shown in a closed position, in which the plug portion 348 is in abutment with or in engagement with a valve seat 350 creating a seal therebetween to disable or close the fluid pathway from the second storage container 302b. The valve seat 350 may be made of a polymer or some other suitable material to ensure a pressure-tight seal between the valve seat 350 and the plug portion 348. To enable or open the fluid pathway from the second storage container 302b, the valve stem 338 is moved toward the bonnet 320 to an open position in which the plug 348 is disengaged from the valve seat 350 to allow fluid to flow between the valve seat 350 and the plug 348. The fluid then flows through side ports 352 of a valve stem sleeve 354 and toward the valve outlet passageway 316.

The movement of the valve stem 338 and, thus, the plug 348 is controlled by the piston 330. That is, if the piston 330 moves toward the storage pressure sensing passageway 328, the valve stem 338 and plug 348 also move toward the storage pressure sensing passageway 328 to an open position to enable the flow path from the second storage container 302b. The piston 330 moves away from the storage pressure sensing passageway 328, the valve stem 338 also moves away from the storage pressure sensing passageway 328 to a closed position bringing the plug 348 into engagement with the valve seat 350 and disabling the flow path from the second storage container 302b.

The piston 330 moves based on or in response to the difference between the opposing forces on the storage pressure sensing surface 334 and the filling pressure sensing surface 336. To provide a pressure bias to the piston 330 to cause the piston 330 to move to an open position when the pressure in the container 304 is less than the pressure in the first storage container 302a, the example sequence valve 300 is provided with a bias spring 356 captured between the spring retainer 332 and a spring seat 358 with the bias force of the spring 356 set to a predetermine magnitude to create a bias pressure. For example, the bias pressure may be set to 250 pounds per square inch (psi), such that the piston 330 begins to move to an open valve position (e.g., slide toward the storage pressure sensing passageway 328) when the container 304 reaches a pressure differential less than the pressure in the first storage container 302a. In other words, when the sum of the pressure provided by the force of the bias spring 356 and the pressure of the container 304 exceeds the pressure of the first storage container 302a, the piston 330 moves toward the storage pressure sensing passageway 328 to an open position to enable or open the flow path between the second storage container 302b and the container 304. The bias force of the spring 356 may be application dependent and therefore could be selected to be any suitable bias force such to create the predetermined pressure as, for example, 50 psi, 100 psi, 250 psi, 400 psi, etc.

To facilitate the engagement of the example sequence valve 300 to a manifold (e.g., the manifold 104 of FIGS. 1 and 2) and to simplify valve maintenance of example cascade systems (e.g., the example cascade system 100 of FIGS. 1 and 2), the base 306 forms a cartridge-like body. The cartridge-like body of the example sequence valve 300 can be easily plugged into a manifold without having to disconnect and/or connect a plurality of fluid lines to the valve passageways (or ports) 314, 316, and 318.

To prevent mixing of the fluids flowing through the storage pressure sensing passageway 328, the filling pressure sensing passageway 318, and the sequence valve inlet passageway 314, the example sequence valve 300 is provided with a plurality of o-rings and static seals. For instance, to prevent the fluid flowing through the storage pressure sensing port 328 from leaking into the storage pressure chamber 329 of the bonnet cavity 324, the piston 330 is provided with an o-ring 360. To prevent fluid from the second storage container 302b from leaking into the bonnet cavity 324, the valve stem 338 is provided with an upper o-ring 362, the stem sleeve 354 is provided with a static seal 364, and the spring seat 358 is provided with a static seal 366. To prevent the fluid flowing from the filling pressure sensing passageway 318 from leaking into other portions of the base cavity 310, the valve stem 338 is provided with a lower o-ring 368.

Figure 4:
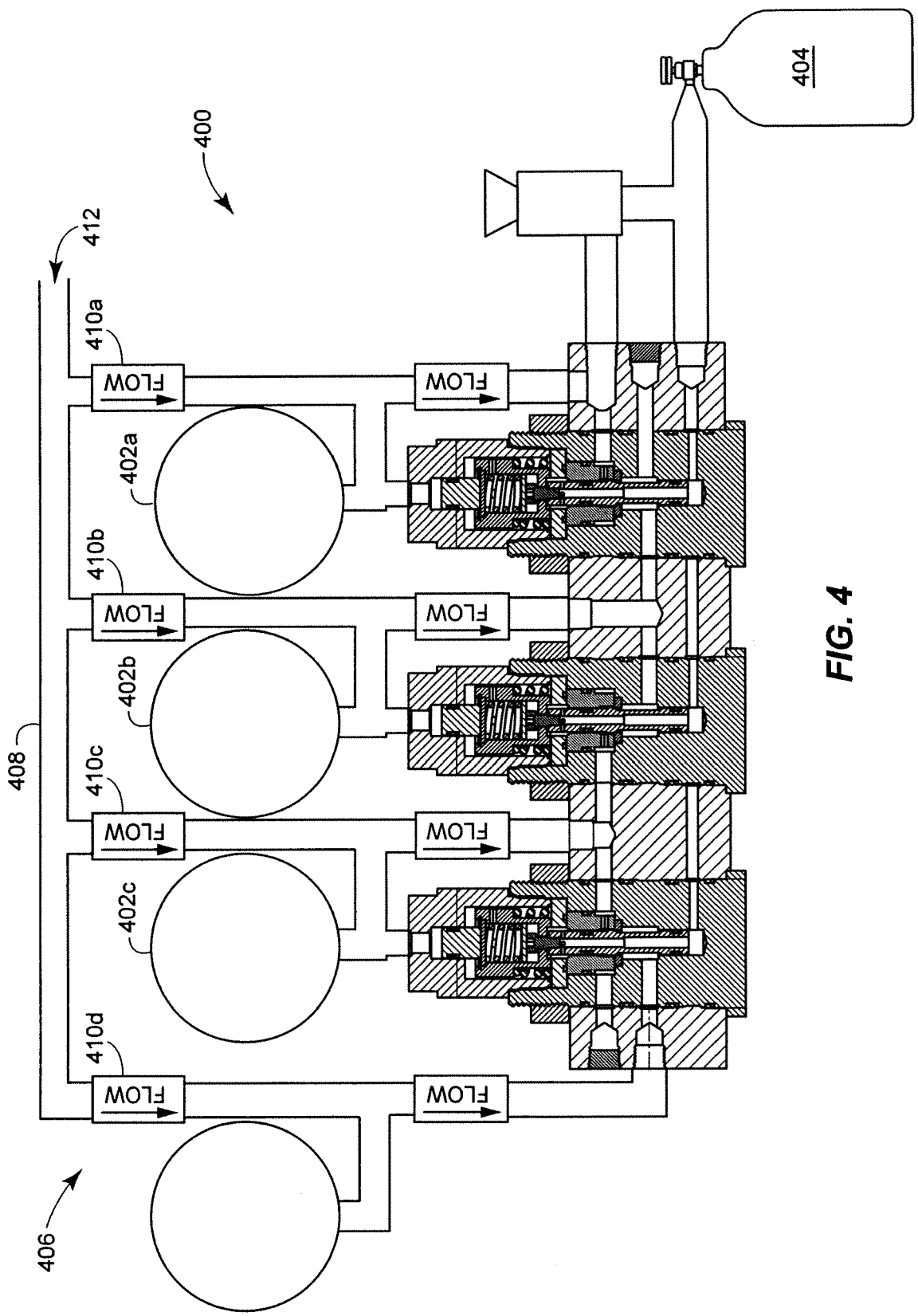
FIG. 4 depicts another example cascade system that may be used to dispense fluid from and recharge a bank of fluid storage containers.

FIG. 4 depicts another example cascade system 400 that may be used to dispense fluid from and recharge a bank of fluid storage containers 402a-d. The example cascade system 400 operates in a substantially similar or identical manner as the example cascade system 100 described above in connection with FIGS. 1 and 2 and may be implemented using a plurality of sequence valves that are substantially similar or identical to the example sequence valve 300 of FIG. 3. However, in addition to delivering fluid from the storage containers 402a-d to a container 404, the example cascade system 400 also enables recharging or refilling the fluid in the storage containers 402a-d. The recharging capability substantially reduces the need to disengage or disconnect the storage containers 402a-d from the example cascade system 400 when the storage containers 402a-d are, for example, depleted and require replenishing or refilling. For instance, although the storage containers 402a-d may be disconnected for maintenance purposes, the containers 402a-d need not be removed for purposes of replenishing their fluid supply when they are empty. Instead, the storage containers 402a-d may be recharged using fluid delivered from a fluid supply (not shown) such as, for example, a storage tanker (e.g., a mobile trailer tanker, an outdoor stationary tanker, etc.), a compressor, etc.

The example cascade system 400 includes a recharge circuit 406 having a recharge fluid line 408 that is communicatively coupled to each of the storage containers 402a-d via respective recharge check valves 410a-d. A fluid supply is connected to the recharge circuit 406 via a recharge inlet 412. Fluid supplied to the recharge inlet 412 recharges the storage containers 402a-d in a sequential manner starting with the container having the lowest pressure. Specifically, the recharge fluid follows a flow path connected to the one of the storage containers 402a-d having the least pressure and begins filling that container first. After the pressure of the first storage container increases to a pressure level matching that of a storage container having the next lowest pressure, the recharge fluid begins flowing to both of the storage containers simultaneously. As the pressure levels in all of the storage containers 402a-d equalize, the recharge fluid fills all of the storage containers 402a-d simultaneously until all of the storage containers 402a-d are filled to a desired level and/or pressure. During operation, as the pressure levels in the storage containers 402a-d deplete at different rates, the recharge check valves 410a-d prevent fluid from higher-pressure storage containers from flowing into lower-pressure storage containers.

Figure 5A:
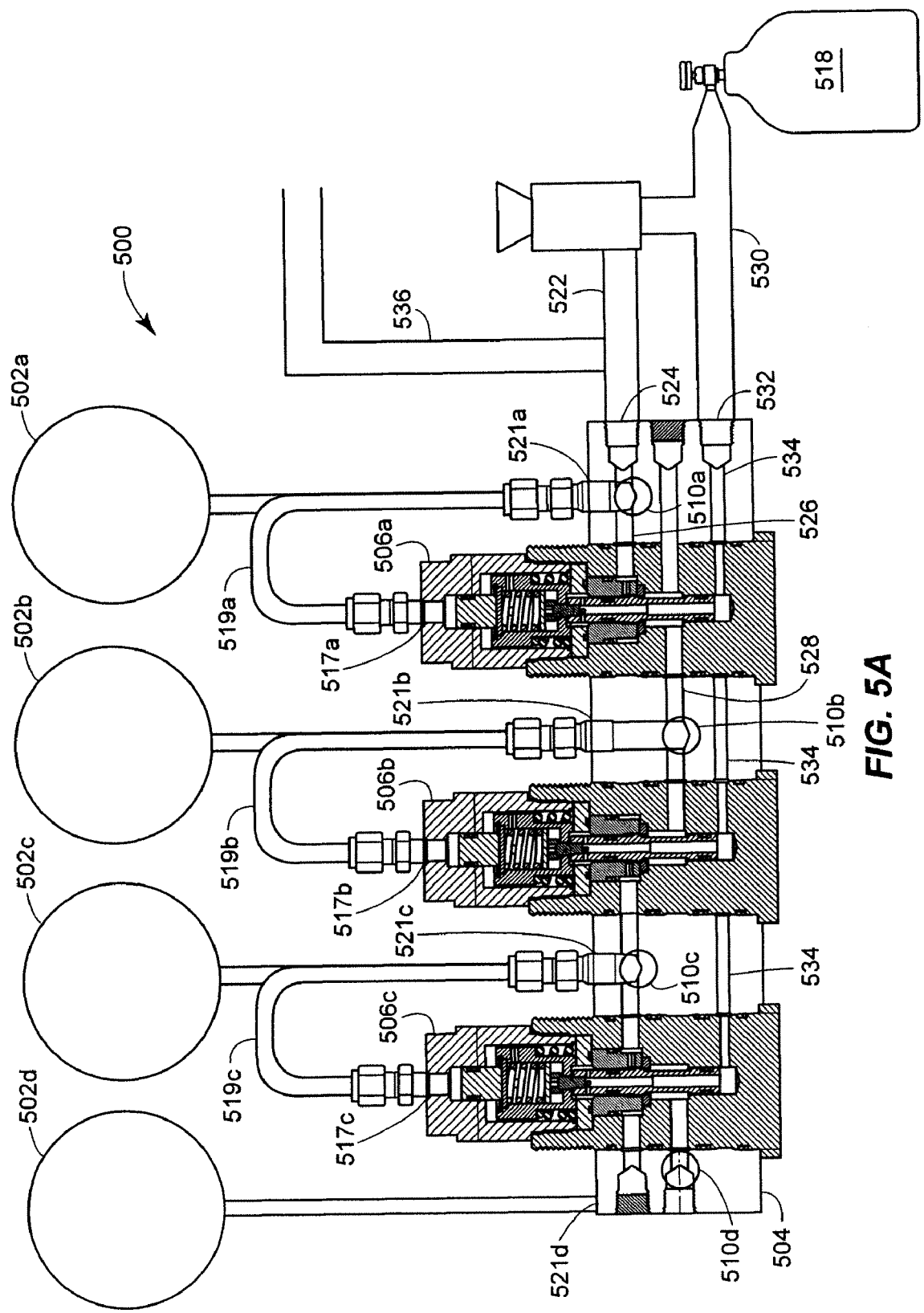
FIG. 5A depicts a front view.
Figure 5B:
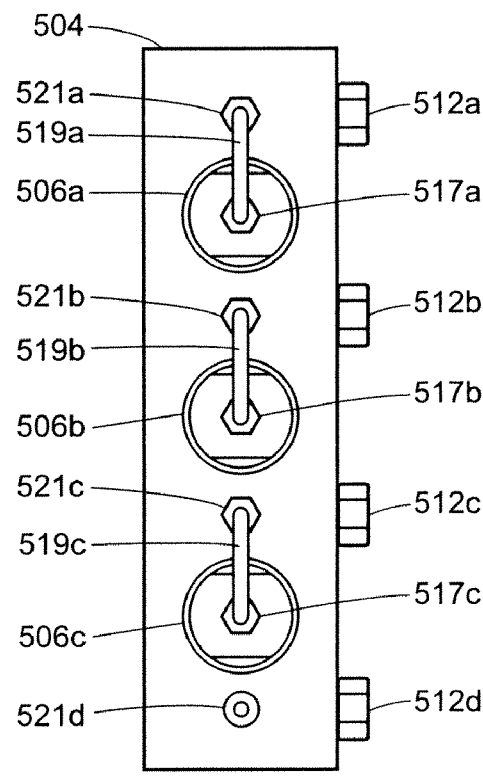
FIG. 5B depicts a top view.
Figure 5C:
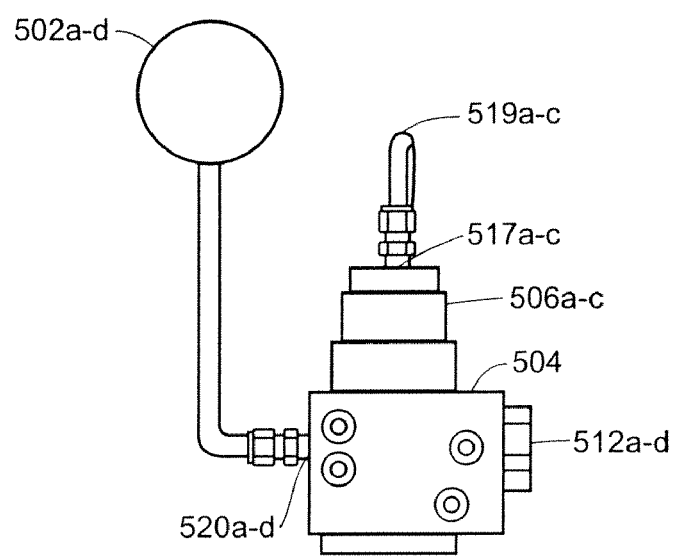
FIG. 5C depicts an end view of another example cascade system that may be used to dispense fluid from and recharge a bank of fluid storage containers using a manifold-integrated recharge circuit.
Figure 6:
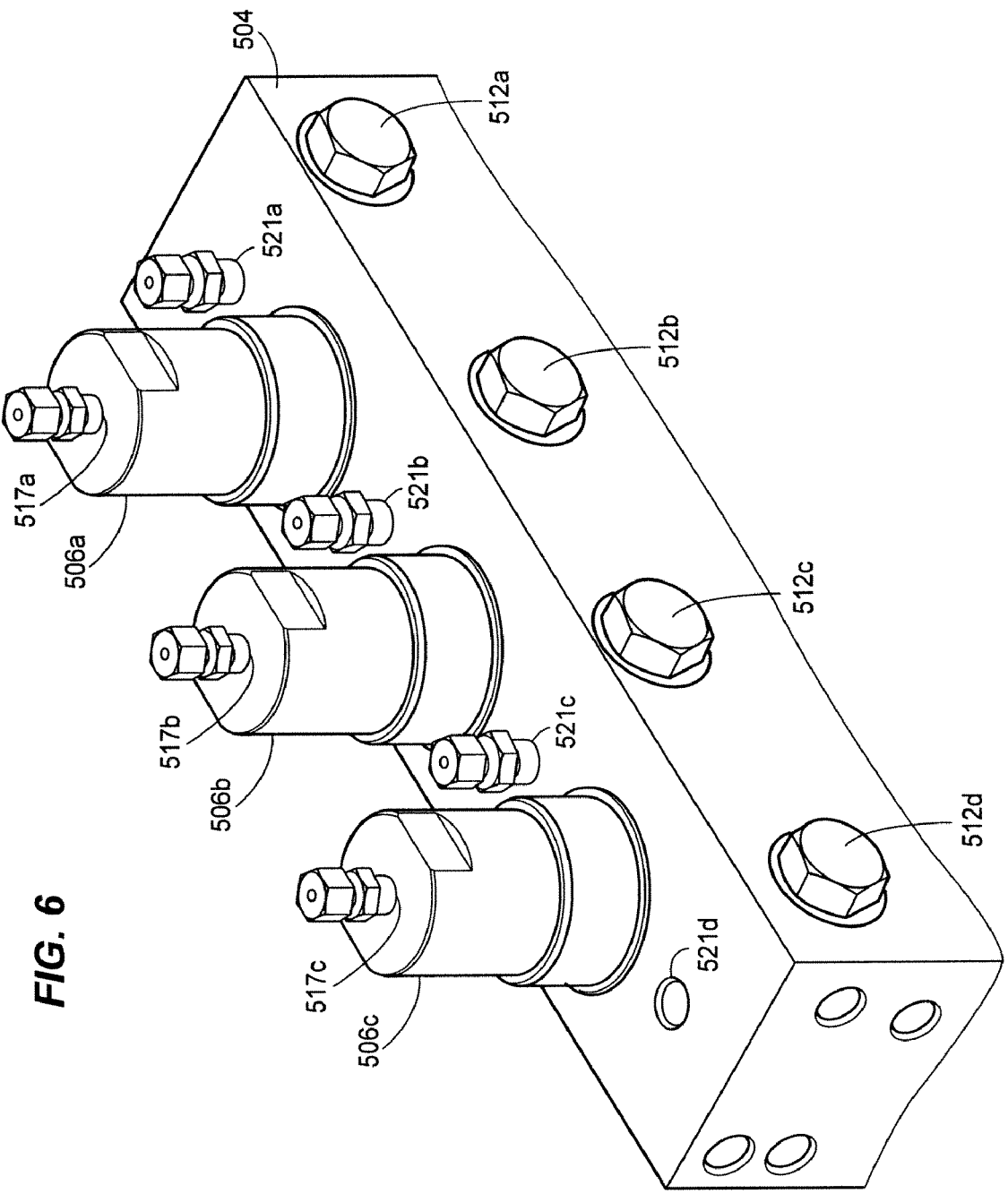
FIG. 6 is an isometric view of the example manifold and a plurality of valves used to implement the example cascade system of FIGS. 5A-5C.
Figure 8:
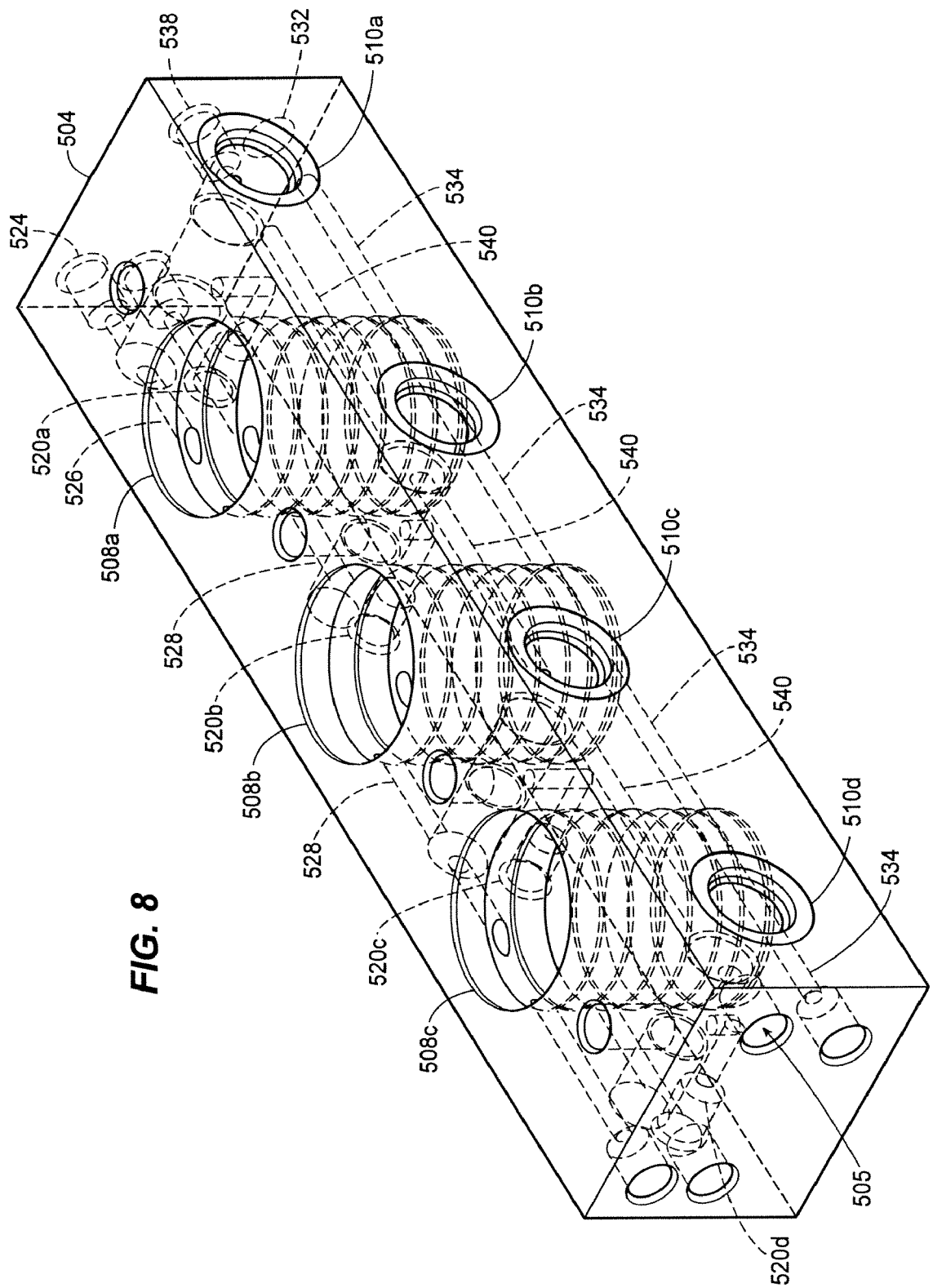
FIG. 8 is an isometric view of the example manifold of FIGS. 5A-5C, 6, and 7 depicting a plurality of fluid passageways formed therein.
Figure 9:
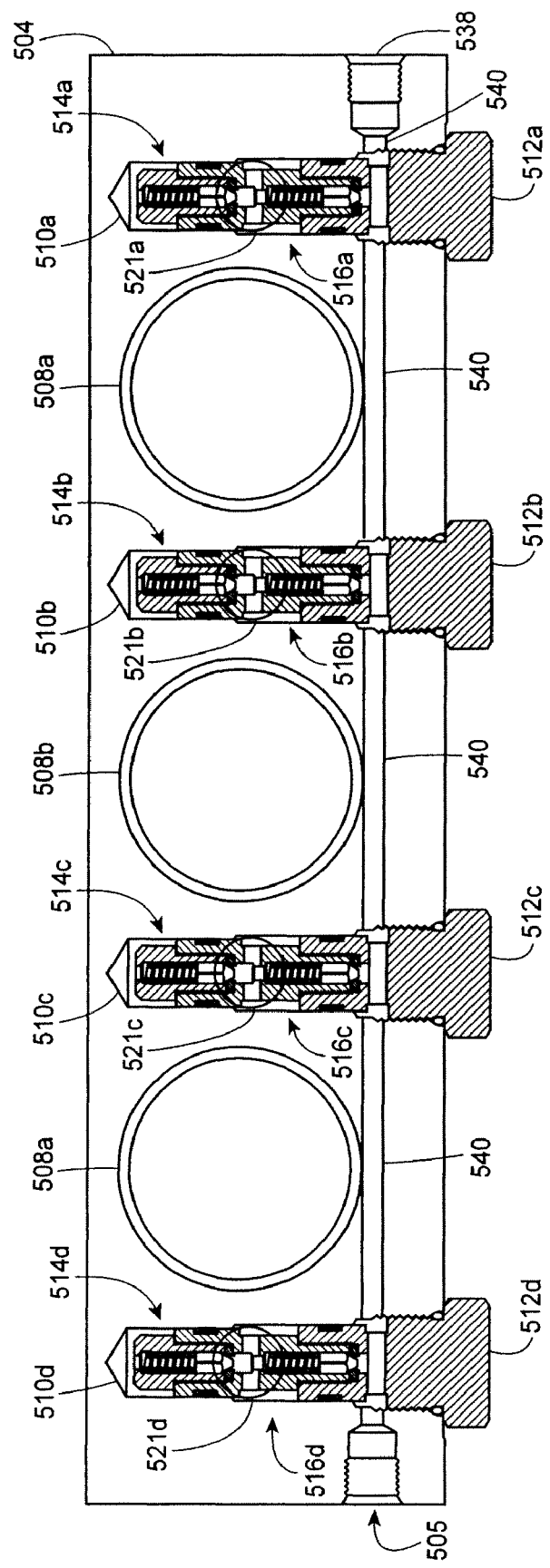
FIG. 9 is a top view of the example manifold of FIGS. 5A-5C and 6-8 having a plurality of dual check valve cartridges.

FIG. 5A depicts a front view, FIG. 5B depicts a top view, and FIG. 5C depicts an end view of another example cascade system 500 that may be used to dispense fluid from and recharge a bank of fluid storage containers 502a-d using a manifold-integrated recharge circuit. The example cascade system 500 includes a manifold 504 which, as shown in FIGS. 8, 9, and 10C, has a fluid recharge circuit 505 formed therein to reduce the amount of fluid line required to implement the recharge circuit. The example cascade system 500 operates in a substantially similar or identical manner as the example cascade system 400 described above in connection with FIG. 4.

Figure 7:
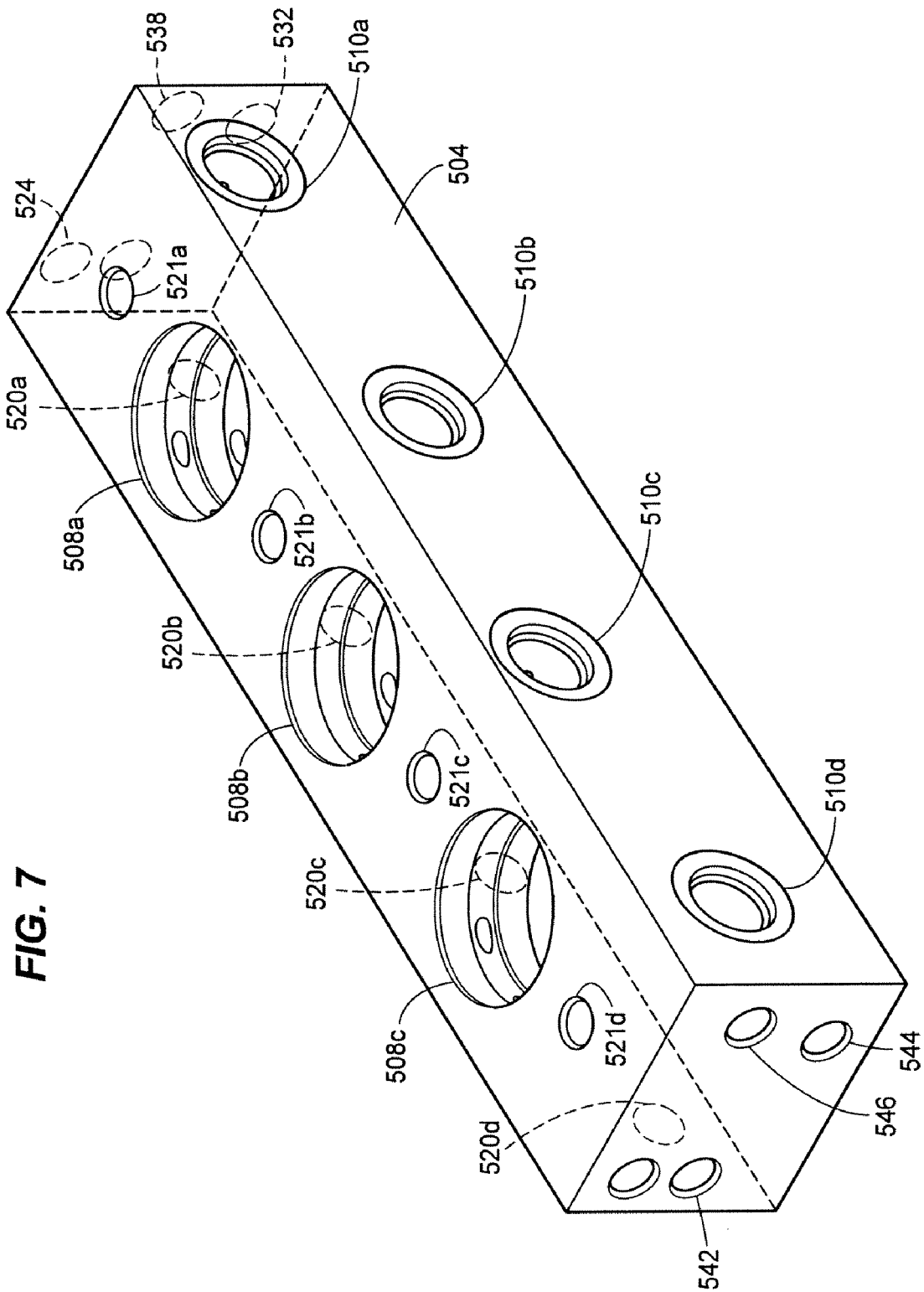
FIG. 7 is an isometric view of the example manifold used to implement the example manifold of FIGS. 5A-5C and 6.

To receive a plurality of sequence valves 506a-c (FIGS. 5A-5C and 6), the manifold 504 includes a plurality of openings 508a-c (i.e., valve cavities) as shown in FIGS. 7-9. Each of the sequence valves 506a-c is substantially similar or identical to the example sequence valve 300 of FIG. 3. The sequence valves 506a-c have cartridge-like bodies or housings configured to plug into, mesh with, or otherwise engage the openings 508a-c.

The manifold 504 includes a plurality of check valve openings 510a-d (i.e., check valve cavities) (FIGS. 5A, 7-9, and 10C) that receive check valve cartridges 512a-d (FIGS. 5B, 5C, 6 and 9), each of which includes two check valves. In particular, as shown in FIG. 9, each of the check valve cartridges 512a-d includes a respective fluid delivery check valve 514a-d and a respective recharge check valve 516a-d. The fluid delivery check valves 514a-d operate in substantially the same manner as the check valves 114a-c of FIGS. 1 and 2. The recharge check valves 516a-d function in substantially the same manner as the recharge check valves 410a-d of FIG. 4. Receiving or mounting the check valve cartridges 512a-d directly in the manifold 504 reduces significantly the amount of fluid line required to implement the example cascade system 500. The check valve cartridges 512a-d are described in greater detail below in connection with FIG. 11.

Each of the storage containers 502a-d is coupled to a respective storage container inlet/outlet port 520a-d (FIGS. 5C, 7, and 8) formed in the manifold 504. The storage container inlet/outlet ports 520a-d (i.e., the storage container ports 520a-d) function as inlet ports when delivering fluid from the storage containers 502a-d to a container 518. However, during a recharge process the storage container ports 520a-d function as outlet ports as described below to deliver recharge fluid to the storage containers 502a-d.

To sense the pressure in the storage containers 502a-c, storage pressure inlet ports 517a-c (FIGS. 5A-5C) in the sequence valves 506a-c are coupled via respective fluid lines 519a-c (FIGS. 5A-5C) to respective manifold outlet ports 521a-c (FIGS. 5A-5C, 6, 7 and 9). Fluid from the storage containers 502a-c flows into the manifold 504 via the storage container inlet ports 520a-c and out of the manifold 504 via the manifold outlet ports 521a-c. The fluid then flows through the fluid lines 519a-c and into the storage pressure inlet ports 517a-c of the sequence valves 506a-c to fill storage pressure sensing chambers (e.g., the storage pressure sensing chamber 329 of FIG. 3) of the sequence valves 506a-c. In this manner, each of the sequence valves 506a-c can sense the pressure of a respective one of the storage containers 502a-c.

Figure 10A:
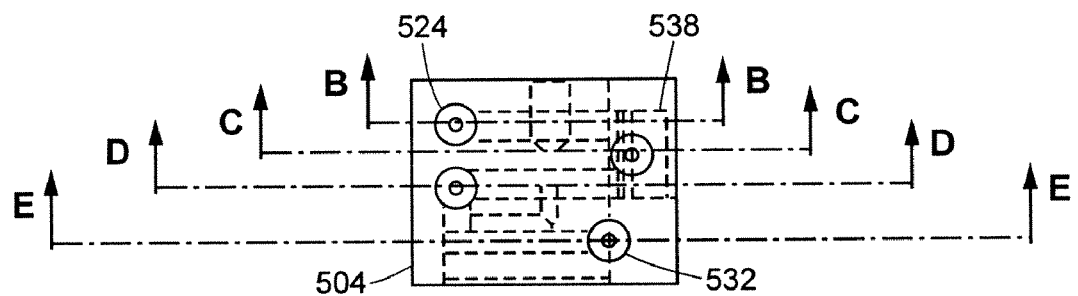
Figure 10A:
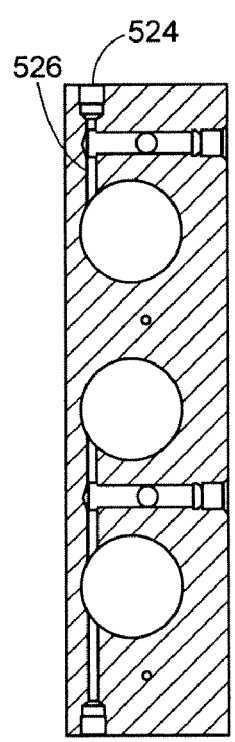
Figure 10A:
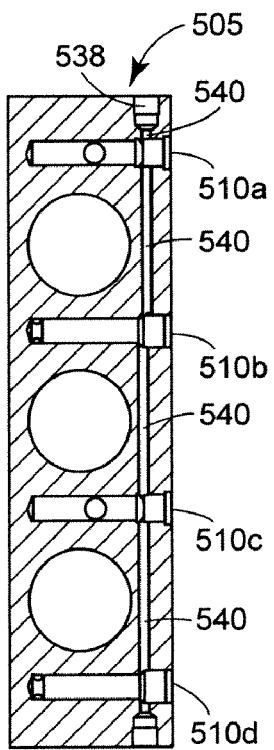
Figure 10A:
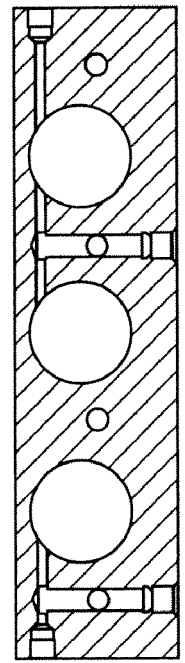
Figure 10A:
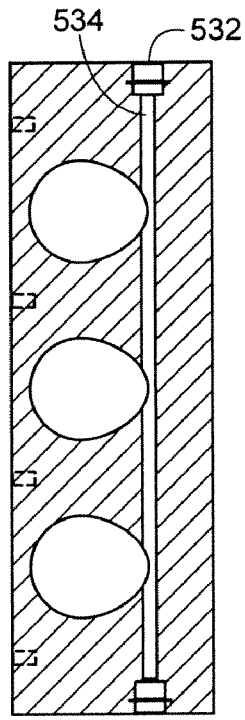

To deliver fluid from the manifold 504 to the container 518, a fluid delivery line 522 (FIG. 5A) is coupled to an outlet port 524 (FIGS. 5A, 7, 8, 10A, and 10B) of the manifold 504. As shown in FIGS. 5A, 8, and 10B, an outlet passageway 526 extends between the first valve opening 508a and the outlet port 524. The outlet passageway 526 enables flow paths (e.g., the container fluid flow paths 120, 130, and 136 of FIG. 2) to deliver fluid from the storage containers 502a-d to the container 518.

To enable fluid delivery from the first storage container 502a, the first storage container port 520a (FIGS. 5C, 7, and 8) is fluidly coupled to the first dual check valve cartridge 512a. In this manner, fluid from the first storage container 502a can flow through the fluid delivery check valve 514a, the outlet passageway 526, and the outlet port 524. To enable fluid delivery from the second storage container 502b, the second storage container port 520b (FIGS. 5C, 7, and 8) is fluidly coupled to the second dual check valve cartridge 512b. In this manner, fluid from the second storage container 502b can flow through the fluid delivery check valve 514b, a fluid passageway 528 extending between the check valve opening 510b and the first sequence valve opening 508a, the sequence valve 506a, the passageway 526, and the outlet port 524. In the illustrated example, fluid from the third and fourth storage containers 502c-d is delivered in a similar manner through respective fluid delivery check valves 514c-d, passageways, and the sequence valves 506a-c.

To sense the pressure in the container 518, a filling container pressure line 530 (FIG. 5A) is coupled to a filling pressure inlet port 532 (FIGS. 5A, 6-8, 10A, and 10E). As shown in FIGS. 5A, 8, and 10E, a filling pressure passageway 534 extends between each of the sequence valve openings 508a-c and the filling pressure inlet port 532 to enable each of the sequence valves 506a-c (FIGS. 5A-5C and 6) to sense the pressure in the container 518 (FIG. 5A).

To replenish the fluid in the storage containers 502a-b, a recharge line 536 (FIG. 5A) is coupled to a recharge inlet port 538 (FIGS. 7-9, 10A, and 10C) of the manifold 504. As shown in FIGS. 8, 9, and 10G, a recharge passageway 540 extends between each of the check valve openings 510a-d and the recharge inlet port 538. During a recharge process, recharge fluid flows through the recharge inlet port 538, and through one of the recharge check valves 516a-d (FIG. 9) corresponding to the storage container having the lowest pressure. For example, if the first storage container 502a has the lowest pressure and the second storage container 502b has the second lowest pressure, the recharge fluid first flows through the first recharge check valve 516a (FIG. 9) and through the first storage container port 520a (FIGS. 5C, 7, and 8) to fill the first storage container 502a. When the first storage container 502a reaches a pressure that is substantially equal to that of the second storage container 502b, the recharge fluid flows simultaneously through the first and second recharge check valves 516a and 516b and the first and second storage container ports 520a and 520b to simultaneously fill the first and second storage containers 502b. The recharge process continues in a similar fashion to replenish the fluid in all of the storage containers 502a-d.

The check valve cartridges 512a-d enable simultaneous filling of the container 518 and recharging of the storage containers 502a-d. For instance, while recharge fluid flows through the first recharge check valve 516a (FIG. 9) to fill the storage container 502a, fluid may simultaneously flow through the first fluid delivery check valve 514a to fill the container 518.

The manifold 504 is configured to fluidly connect the fluid delivery line 522 (FIG. 5A), the filling container pressure line 530 (FIG. 5A), and the recharge line 536 (FIG. 5A) at either end of the manifold 504. For example, in an alternative example implementation, the fluid delivery line 522, the filling container pressure line 530, and the recharge line 536 may be fluidly coupled to ports 542, 544, and 546 (FIG. 7), respectively, and the fluid line 519c (FIG. 5B) may be fluidly coupled to the manifold outlet port 521d, the fluid line 519b (FIG. 5B) may be fluidly coupled to the manifold outlet port 521c, and the fluid line 519a (FIG. 5B) may be fluidly coupled to the manifold outlet port 521b. In this manner, the manifold 504 may be used to deliver fluid via the end having the ports 542, 544 and 546 (FIG. 7). In any implementation, any ports not fluidly coupled to something (e.g., not fluidly coupled to fluid line, a valve, etc.) should be terminated or plugged to prevent fluid from leaking out of the manifold 50 during operation.

Although not shown, pressure sensor device outlets or openings may also be formed in the manifold 504 to enable monitoring of the pressure in each of the storage containers 502a-d using gauges, analog sensors, and/or digital sensors. The pressure sensor device outlets may be configured to connect to pressure sensor devices or gauges via fluid lines or to receive directly the pressure sensor devices or gauges without any intermediate fluid lines.

Figure 11:
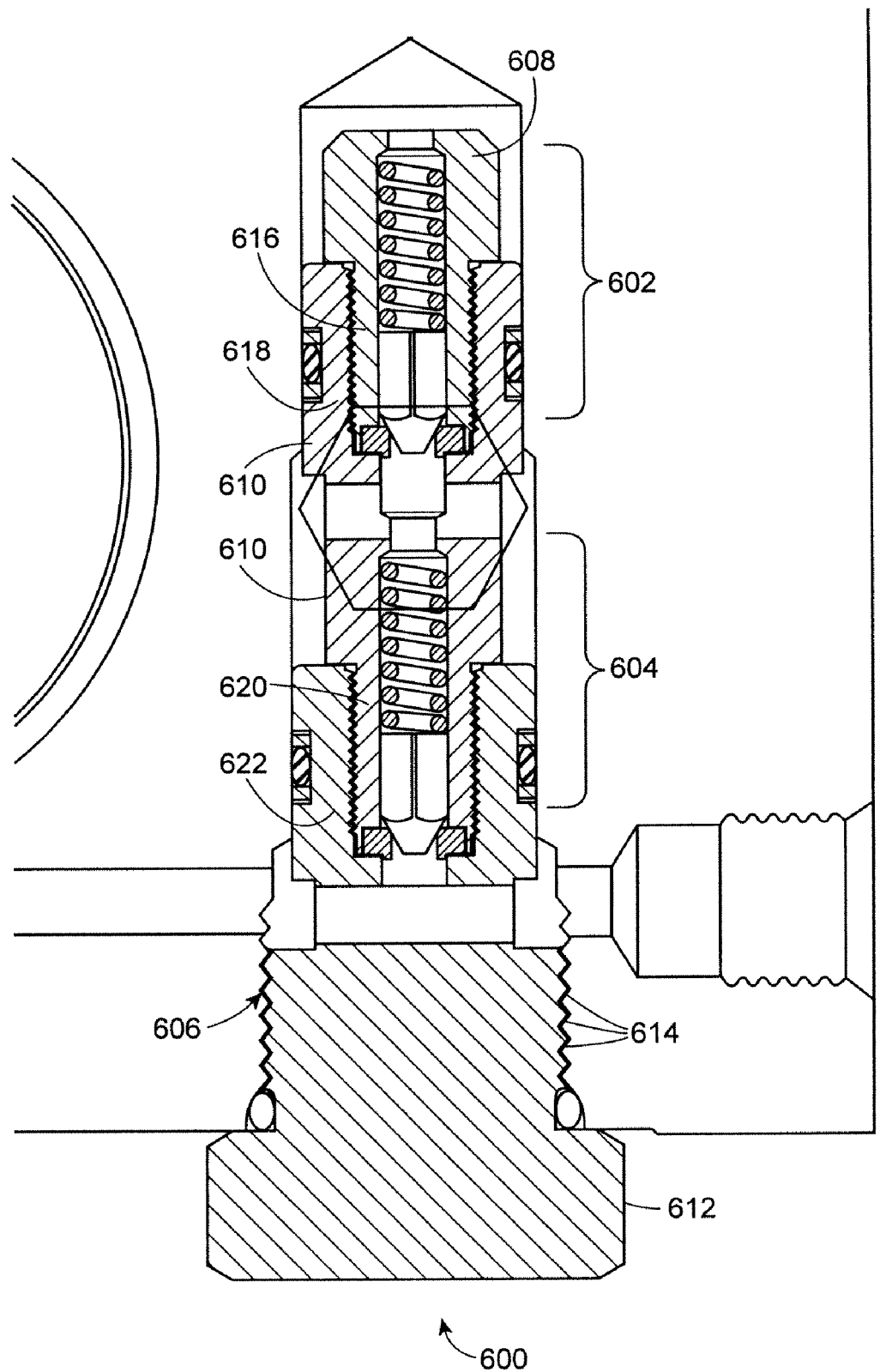
FIG. 11 is a detailed illustration of one of the dual check valve cartridges of FIGS. 5B, 5C, 6, and 9.

FIG. 11 is a detailed illustration of an example dual check valve cartridge 600 that may be used to implement the example dual check valve cartridges 512a-d of FIGS. 5B, 5C, 6, and 9. The example check valve cartridge 600 includes a first check valve 602 and a second check valve 604 that may operate independently. For instance, the first check valve 602 may be used to implement the fluid delivery check valves 514a-d of FIG. 9 to enable fluid to flow from the storage containers 502a d to the container 518. The second check valve 604, on the other hand, may be used to implement the recharge check valves 516a-d of FIG. 9 and enables recharge fluid to flow from the recharge passageway 540 to the storage containers 502a-d during a recharge process.

In the illustrated example, the example dual check valve cartridge 600 includes a housing 606 having a first check valve housing portion 608 that includes the first check valve 602, a second check valve housing portion 610 that includes the second check valve 604, and a fastening housing portion 612 having a threaded surface 614 that enables fastening of the example dual check valve cartridge 600 to a cavity or opening such as, for example, the check valve openings 510a-d of FIGS. 5A, 7, 8, and 10C.

The check valves 602 and 604 are arranged in an end-to-end configuration and are in axial alignment with one another along the length of the check valve cartridge 600. In particular, the first check valve housing portion 608 includes an external threaded end portion 616 that threadedly engages an internal threaded end portion 618 of the second check valve housing portion 610 to bring the check valves 602 and 604 into substantial axial alignment with one another. The second check valve housing portion 610 has an external threaded end portion 620 that threadedly engages an internal threaded end portion 622 of the fastening housing portion 612.

Figure 12:
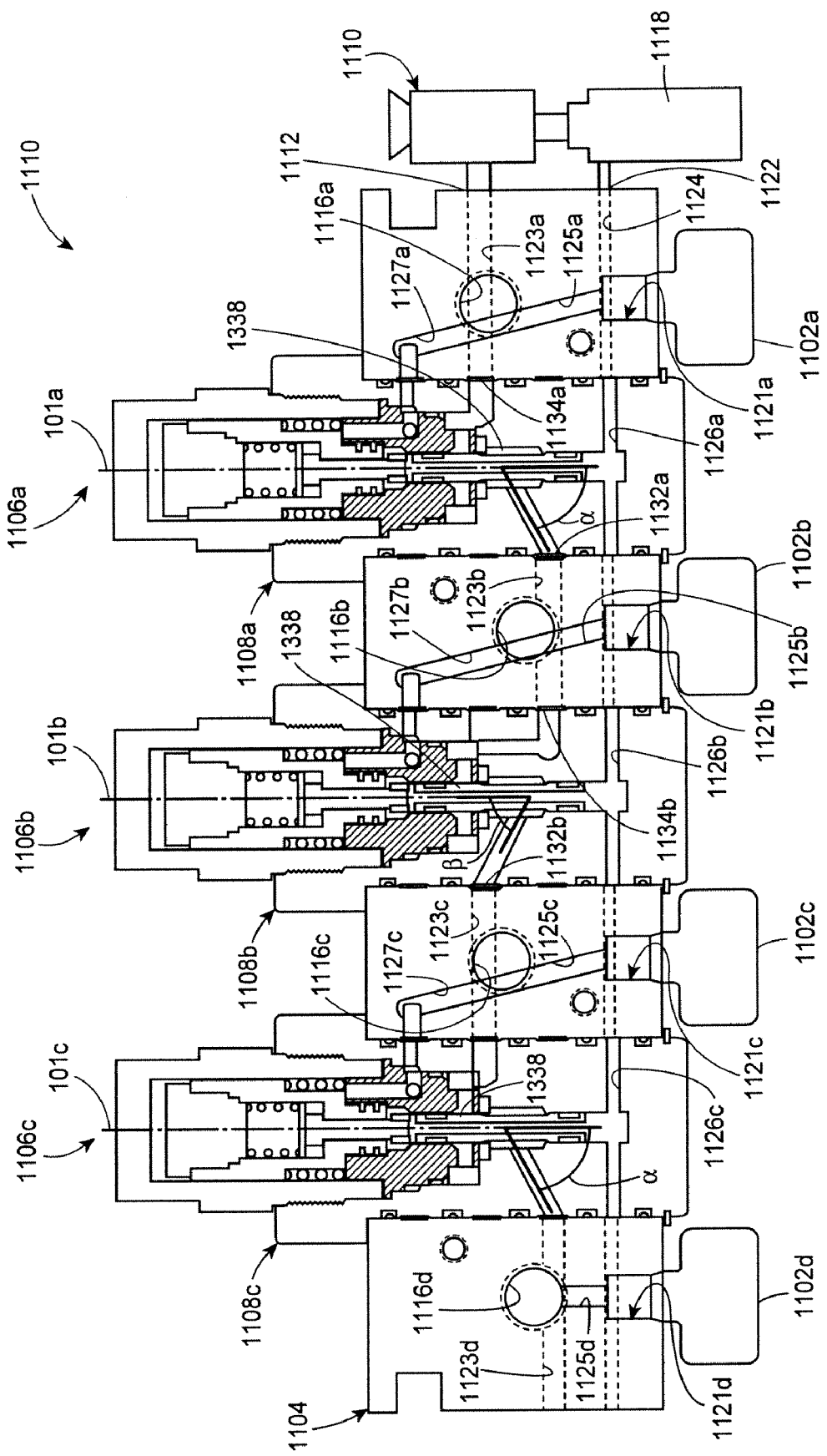
FIG. 12 depicts a cross-sectional view of another example cascade system constructed in accordance with the present invention that may be used to deliver fluid from a bank of containers.
Figure 13:
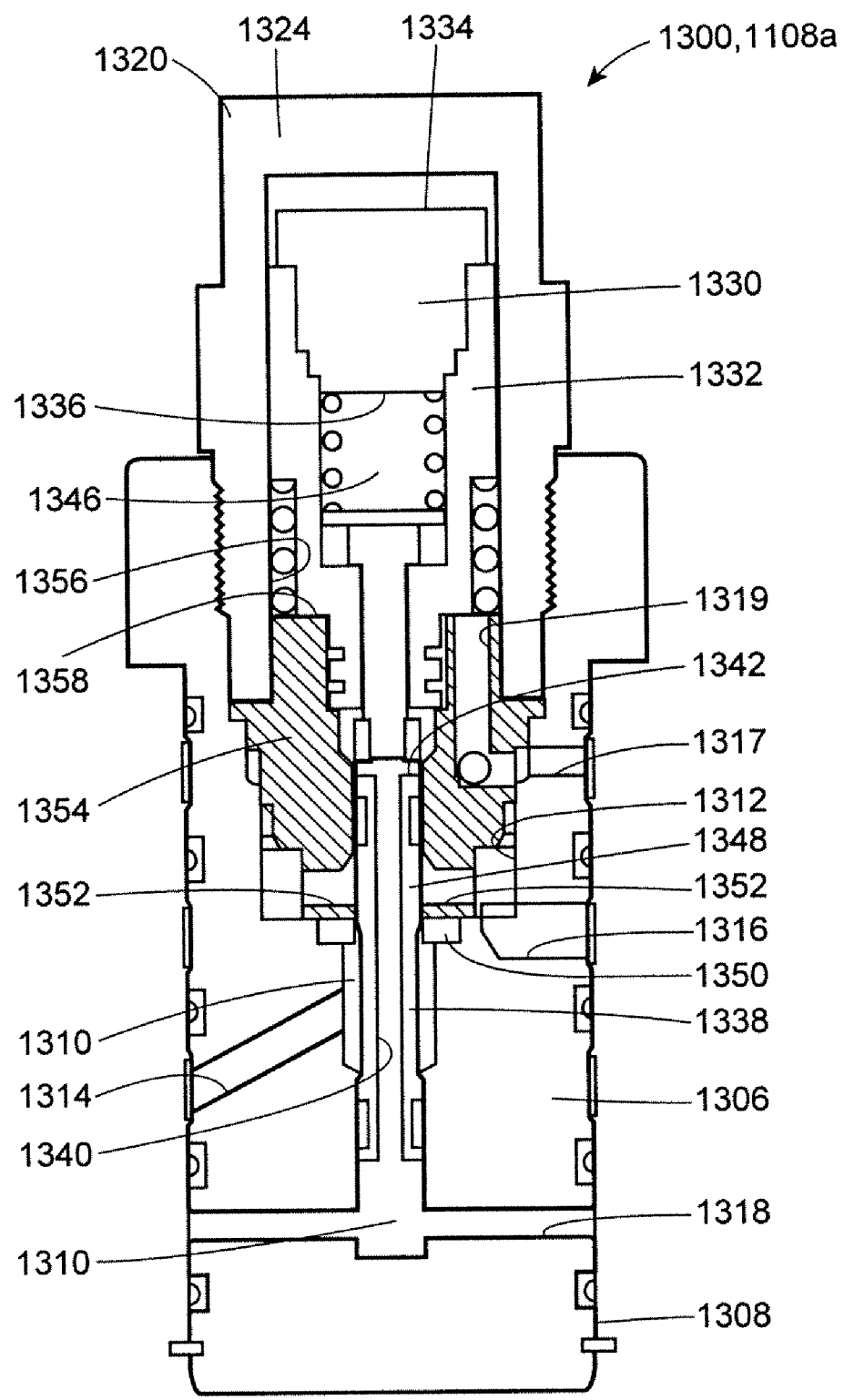
FIG. 13 depicts cross-sectional side view of an example of a sequence valve of the cascade system of FIG. 12.

Now turning in detail to FIGS. 12 and 13, which illustrate cross-sectional views of yet another example cascade system 1100 that may be used to deliver fluid (e.g., oxygen, natural gas, propane, hydrogen, etc.) from a bank of fluid storage containers 1102a-d in accordance with the principles of the present invention. The cascade system 1100 includes a manifold 1104 having a plurality of sequence stages 1106a, 1106b, and 1106c. Each of the sequence stages 1106a, 1106b, and 1106c includes a respective sequence valve 1108a, 1108b, and 1108c coupled to the manifold 1104. Each of the sequence valves 1108a, 1108b, and 1108c is fluidly coupled to a respective one of the fluid storage containers 1102a, 1102b, and 1102c. A regulator 1110 is coupled to a manifold outlet port 1112 to enable the filling of a fluid container 1118 (e.g., a fluid-depleting container, a refillable container, a bottle, a pressure vessel, etc.) with the fluid provided by the storage containers 1102a-d.

Each of the storage containers 1102a-d is coupled to the manifold 1104 via a respective one of a plurality of container ports 1121a-d, either directly or through a fluid line (not shown) or other conduit. The container ports 1121a-d each include linear segments 1125a-d that communicate with a respective one of a plurality of delivery passageways 1123a-d defined by the manifold 1104 and communicating with the sequencing valves 1108a-c, as will be described. Additionally, the first through third container ports 1121a-c of the disclosed embodiment, each include elbow segments 1127a-c defined by the manifold 1104 and extending from the respective linear segments 1125a-c to the respective first through third sequence valves 1108a-c. So configured, the elbow segments 1127a-c supply pressure from the first through third storage containers 1102a-c to the first through third sequence valves 1108a-c, as will be described. The manifold 1104 additionally defines check valve ports 1116a-d for receiving check valves (not shown) such as check valves 114 or check valves 512 described above, for example. The check valves would be configured to communicate with the container ports 1121a-d and/or the delivery passageways 1123a-d to enable fluid flow in only one direction (e.g., fluid flow toward the manifold outlet port 1112) and, thus, prevent fluid back-flow into the storage containers 1102a-d from the manifold outlet port 1112 or any other source.

The example cascade system 1100 enables the storage containers 1102a-d to provide sufficient pressure to fill containers such as the container 1118 with the fluid stored in the fluid storage containers 1102a-d. For example, to fill the container 1118, the sequence valves 1108a-c activate delivery from each of the fluid containers 1102*a-d* in a sequential manner to ensure that the pressure output from the manifold 1104 is sufficiently high relative to the pressure in the container 1118 to enable filling of the container 1118. During operation, after connecting the container 1118 to the regulator 1110, fluid is delivered from the first storage container 1102*a*, through the linear segments 1125*a* of the first container port 1121*a*, and the first delivery passageway 1123*a* to the manifold outlet port 1112.

To detect the amount of pressure in the container 1118, the container 1118 is connected to or fluidly coupled to a pressure sensing port 1122 of the manifold 1104. The pressure sensing port 1122 is coupled to a pressure sensing passageway 1124 formed in the manifold 1104. The pressure sensing passageway 1124 connects to pressure sensing passageways 1126*a-c* of each sequence valve 1108*a-c*. The fluid pressure in the container 1118 is coupled via the pressure sensing flow path 1128 to enable each of the sequence valves 1108*a-c* to sense the pressure in the container 1118 during the filling process.

When the pressure in the container 1118 rises to a particular level relative to the pressure in the first storage container 1102*a*, the first sequence valve 1108*a* automatically enables (e.g., opens) the second storage container 1102*b* to supply fluid to the manifold outlet port 1112. The second storage container 1102*b* delivers fluid to the container 1118 via the first sequencing valve 1108*a*. In particular, the fluid from the second storage container 1102*b* flows through the check valve disposed in the second check valve port 1116*b*, a first stage inlet port 132*a*, the first sequence valve 1108*a*, and out of a first stage outlet port 1134*a*, through the first delivery passageway 1123*a*, and to the manifold outlet port 1112. Flow from the first container 1102*a* is substantially disabled (e.g., closed) when the second storage container 1102*b* is enabled. The first sequence valve 1108*a* and the check valve disposed in the first check valve port 1116*a* operate to prevent the fluid from the second storage container 1102*b* from flowing into the first storage container 1102*a*.

When the pressure in the container 1118 increases to a particular level relative to the pressure in the second storage container 1102*b*, the second sequence valve 1108*b* automatically enables the third storage container 1102*c* to supply fluid to the manifold outlet port 1112. The third storage container 1102*c* delivers fluid to the container 1118 via the second sequence valve 1108*b* and then the first sequencing valve 1108*a*. As shown in FIG. 12, the fluid from the third storage container 1102*c* flows through the check valve disposed in the third check valve port 1116*c*, a second stage inlet port 1132*b*, the second sequence valve 1108*b*, a second stage outlet port 1134*b*, the second delivery passageway 1123*b* of the manifold 1104, the first stage inlet port 1132*a*, the first sequence valve 1108*a*, the first stage outlet port 134*a*, the first delivery passageway 1123*a*, and to the manifold outlet port 112. When the pressure in the container 1118 reaches a particular level relative to the third storage container 1102*c*, the third sequence valve 1108*c* automatically enables flow from the fourth storage container 1102*d* in a manner similar to that just described with respect to the first and second sequence valves 1108*a*, 1108*b*.

In some example implementations, the manifold 1104 may be adapted to accommodate additional storage containers (e.g., a fifth storage container) (not shown) and additional sequence valves (e.g., a fourth sequence valve).

When fluid delivery is shut off via the regulator 1110 and the container 1118 is disconnected from the example cascade system 1100, the sequence valves 1108*a-c* stop the flow from second, third, and fourth storage containers 1102*b-d*, thereby enabling the first storage container 1102*a* to at least partly fill any subsequent container 1118 that may be connected to the example cascade system 1100.

Although the above-described process involves sequentially activating fluid delivery from four storage containers 1102*a-d*, if the desired pressure in the container 1118 does not exceed a level for which the first storage container 1102*a* cannot continue delivering fluid, then the container 1118 may be filled without activating the subsequent storage containers 1102*b-d*.

FIG. 13 depicts an example sequence valve 1300 that may be used to implement the example sequence valves 1108*a-c* described above in connection with the example cascade system 1100 depicted in FIG. 12. In the illustrated example, the sequence valve 1300 may embody the first sequence valve 1108*a* depicted in FIG. 12, for example, and therefore is adapted to be coupled between the first storage container 1102*a* and the second storage container 1102*b*.

The example sequence valve 1300 includes a base 1306 having a base outer surface 1308 and a base cavity 1310 defining a base inner surface 1312. The base 1306 also includes a valve inlet passageway 1314 and a valve outlet passageway 1316. The valve inlet passageway 1314 extends between the base outer surface 1308 and the base inner surface 1312 and provides a flow path to enable fluid to flow from the second storage container 1302*b* to the base cavity 1310. The valve outlet passageway 1316 extends from the base cavity 1310 to the base outer surface 1308 and provides a flow path for the fluid from the second container 1302*b* to flow from the base cavity 1310 to the filling container 1118.

To enable the sequence valve 1300 to sense a fluid pressure in the container 1118, the base 1306 further includes a filling pressure sensing passageway 1318, which corresponds to the pressure sensing passageway 1126*a* depicted in FIG. 12. The filling pressure sensing passageway 1318 extends between the base outer surface 1308 and the base cavity 1310. The filling pressure sensing passageway 1318 provides a path to enable fluid pressure to be coupled from the container 1118 to the base cavity 1310.

Further still, the base 1306 of the sequence valve 1300 defines a container pressure sensing passageway 1317 extending between the base outer surface 1308 and the base cavity 1310. The container pressure sensing passageway 1317 enables fluid pressure to be coupled from the storage container 1102*a* to the base cavity 1310. The container pressure sensing passageway 1317 enables fluid pressure to be coupled from the container 1102*a* to a control passageway 1319 defined within a valve stem sleeve 1354 carried within the base cavity 1310, as will be described further.

The example sequence valve 1300 also includes a bonnet 1320 having a bonnet cavity 1324. To enable the example sequence valve 300 to sense the pressure in the first storage container 1102*a*, the bonnet cavity 1324 is in fluid communication with the control passageway 1319 in the valve stem sleeve 1354.

The base 306 is coupled to the bonnet 320 to form a pressure-tight seal and encapsulate a plurality of valve components including a portion of the valve stem sleeve 1354 mentioned above. Additionally, the base 1306 and the bonnet 1320 encapsulate a piston 1330 that is coupled to a spring retainer 1332 and slidably disposed within the bonnet cavity 1324. The piston 1330 has a storage pressure sensing surface 1334 and a filling pressure sensing surface 1336 opposing the storage pressure sensing surface 1334. The pressure in the first storage container 1102*a* is communicated and applies a force to the storage pressure sensing surface 1334 via the container port 1121*a* in the manifold 1104, the container pressure sensing passageway 1317 in the base 1306 of the sequence valve 1108*a*, and the control passageway 1319 in the valve stem sleeve 1354. The pressure in the filling container 1118 is communicated and applies a force to the filling pressure sensing surface 1336, as will be described.

For example, to sense the pressure in the container 1118, the example sequence valve 1300 includes a valve stem 1338 having a valve stem passageway 1340 formed therethrough. The fluid pressure in the container 1118 is coupled to the filling pressure sensing passageway 1318, the stem passageway 1340, valve stem side ports 1342, and into a spring retainer chamber 1346. Thus, the pressure in the container 1118 applies a force to the filling pressure sensing surface 336 that opposes the force applied against the storage pressure sensing surface 1334 by the storage container 1102*a*. The example sequence valve 300 enables (e.g., opens) and disables (e.g., closes) fluid flow from the second storage container 1302*b* to the container 1118 based on the difference between the opposing forces that are applied to the pressure sensing surfaces 334 and 336.

To disable and enable the fluid pathway from the second storage container 1102*b*, the valve stem 1338 is provided with a plug portion 1348. The valve stem 1338 is shown in a closed position, in which the plug portion 1348 is in abutment with or in engagement with a valve seat 1350 creating a seal therebetween to disable or close the fluid pathway from the second storage container 1102*b*. The valve seat 1350 may be made of a polymer or some other suitable material to ensure a pressure-tight seal between the valve seat 1350 and the plug portion 1348. To enable or open the fluid pathway from the second storage container 1102*b*, the valve stem 1338 is moved toward the bonnet 1320 to an open position in which the plug 1348 is disengaged from the valve seat 1350 to allow fluid to flow between the valve seat 1350 and the plug 1348. The fluid then flows through side ports 1352 of a valve stem sleeve 1354 and out through the valve outlet passageway 1316. In accordance with the foregoing description, it should be appreciated that each sequence valve 1108*a-c* includes a valve element for controlling the flow of fluid through the base 1306. The valve element may be understood as including, but not limited to, the valve stem 1338, the plug 1348, the piston 1330, the valve stem retainer 1332, the valve stem sleeve 1354, and/or any other component carried by the sequence valve 1108*a-c* for controlling the flow of fluid therethrough.

One feature of the present example cascade system 1100 is that the valve inlet passageway 1314 in the base 1306 of each sequence valve 1108*a-c* depicted in FIG. 12 is disposed in fluid communication with the bottom-side of the valve seat 1350. As depicted in FIG. 12, for example, the valve inlet passageway 1314 of each sequence valve 1108*a-c* is disposed at an angle $\alpha$, $\beta$ that is less than ninety-degrees (90°) relative to a longitudinal axis 101*a-c* of the respective valve stem 1338. For example, in the disclosed embodiment, the valve inlet passageways 1314 of the first and third sequence valves 1108*a*, 1108*c* incline toward the respective valve stems 1338 and intersect the longitudinal axes 101*a*, 101*c* thereof at an angle $\alpha$ that is approximately forty-five degrees (45°). Additionally, the valve inlet passage way 1314 of the second sequence valve 1108*b* declines toward the respective valve stem 1338 and intersects the longitudinal axis 101*b* thereof at an angle $\beta$ that is approximately forty-five degrees (45°). In other embodiments, the angles $\alpha$, $\beta$ may be generally any angle or other configuration so long as the valve inlet passageways 1314 of every sequence valve 1108*a-c* communicates with the bottom-side of the valve seat 1350. Moreover, in the disclosed embodiment, the angles $\alpha$, $\beta$ of the valve inlet passageways 1314 relative to the valve stems 1338 causes the valve inlet passageways 1314 to be disposed at angles relative to the delivery passageways 1123*a-d* defined by the manifold.

So configured, pressure from the respective upstream storage containers 1102*b-d* is communicated to the bottom-side of the valve seat 1350. For example, with respect to the first sequence valve 1108*a* depicted in FIG. 12, the pressure from the second storage container 1102*b* is communicated through the second container port 1121*b* and the second delivery passageway 1123*b* in the manifold 1104, and then through the valve inlet passageway 1314 (identified in FIG. 13) of the first sequence valve 1108*a* to the bottom-side of the valve seat 1350. The valve inlet passageways 1314 of the second and third sequence valves 1108*b-c* depicted in FIG. 12 are similarly arranged. This is in contrast to the previous example cascade systems 100, 400, 500 discussed herein. For example, with respect to the cascade system 100 depicted in FIG. 1, pressure from the third storage container 102*c* is communicated to the top of the valve seat of the second sequence valve 108*b*. So configured, the valve seat must be carefully machined to close tolerances to balance the valve element and ensure accurate operation of the valve, especially under conditions where the valve is pressurized from both the inlet and outlet sides. Thus, the cascade system 1100 disclosed with reference to FIGS. 12 and 13 maximizes the accuracy of operation of each sequence valve 1108*a-c* under all conditions by always supplying the pressure from the upstream storage container 1102*b-d* to the bottom-side of the valve seat 1350. In the disclosed example, this is made possible by the angled valve inlet passageways 1314 in each sequence valve 1108*a-c*.

With continued reference to FIG. 13, the movement of the valve stem 1338 and, thus, the plug 1348 is controlled by the piston 1330. That is, if the piston 1330 moves toward the bonnet 1320, the valve stem 1338 and plug 1348 also move toward the bonnet 1320 to an open position to enable the flow path from the second storage container 1102*b*. The piston 1330 moves away from the bonnet 1320, the valve stem 1338 also moves away from the bonnet 1320 to a closed position bringing the plug 1348 into engagement with the valve seat 1350 and disabling the flow path from the second storage container 1102*b*.

The piston 1330 moves based on or in response to the difference between the opposing forces on the storage pressure sensing surface 1334 and the filling pressure sensing surface 1336. To provide a pressure bias to the piston 1330 to cause the piston 1330 to move to an open position when the pressure in the container 1118 is less than the pressure in the first storage container 1102*a*, the example sequence valve 1300 is provided with a negative bias spring 1356 captured between the spring retainer 1332 and a spring seat 1358 of the valve stem sleeve 1354. If the bias force of the spring 1356 provides a predetermined pressure that is, for example, 250 pounds per square inch (psi), the piston 1330 begins to move to an open valve position (e.g., slide toward the bonnet 1320) when the container 1118 reaches a pressure that is 250 psi less than the pressure in the first storage container 1102*a*. In other words, when the sum of the pressure provided by the force of the negative bias spring 1356 and the pressure of the container 1118 exceeds the pressure of the first storage container 1102*a*, the piston 1330 moves upward toward the bonnet 1320 to an open position to enable or open the flow path between the second storage container 1102*b* and the container 1118. The pressure created by the bias force of the spring 1356 may be selected to be any suitable pressure bias such as, for example, 50 psi, 100 psi, 250 psi, 400 psi, etc.

To facilitate the engagement of the example sequence valve 1300 to the manifold 1104 depicted in FIG. 12 and to simplify valve maintenance of example cascade systems, the base 1306 forms a cartridge-like body. The cartridge-like body of the example sequence valve 1300 can be easily plugged into the manifold 1104 without having to disconnect and/or connect any fluid lines. Accordingly, the example cascade system 1100 described with reference to FIGS. 12 and 13 advantageously eliminates the inefficiencies involved with assembling and maintaining a cascade system having a plurality of fluid lines external to the manifold, which requires careful coupling of the various components including the manifold to the fluid lines with hose clamps, or some other means, for example. Rather, the manifold 1104 of the example depicted in FIG. 12 provides for simple cartridge-type assembly with the sequence valves 1108*a-c*, storage containers 1102*a-d*, and any check valves.

In fact, a common advantage of every embodiment described herein is that each includes a plurality of sequence valves, each sequence valve defining a base that is disposed within the manifold such that the inlet ports, outlet ports, and at least one pressure sensing passageway is disposed at a location inside of the external boundaries of the manifold. This configuration greatly reduces the complexity of any fluid lines and/or piping required.

To prevent mixing of the fluids flowing through the sequencing valve 1300, the sequencing valve 1300 may include one or more static and/or dynamic seal similar to the sequence valve 300 described above with reference to FIGS. 1 and 2, for example. Additionally, in alternative examples, the manifold 1104, the storage containers 1102*a-d*, or some other components of the example cascade system 1100 depicted in FIGS. 12 and 13 may include gauges or meters for reading and displaying the pressures within the storage containers 1102*a-d*, the filling container 1118, the manifold delivery passageways 1123*a-d*, the container ports 1121*a-d*, or any other location of the system 1100.

While the various example cascade systems 100, 400, 500, 1100 described herein have been generally described as including a single manifold accommodating three sequence valves such as sequence valves 1108*a-c* depicted in FIG. 12, for example, alternative embodiments of the cascade systems 100, 400, 500, 1100 may include multiple manifolds connected together in an end-to-end configuration, for example, to accommodate additional sequence valves, thereby capable of accommodating additional fluid storage containers.

While the various systems have been described herein as including a plurality of "fluid storage containers" 102, 302, 402, 502, 1102 connected to the various manifolds, it should be appreciated that for the purposes of explanation and for the attached claims, these containers can also be referred to as "fluid supply containers" such that they are clearly distinguished from the containers to be filled by the various systems.

While the example cascade system 1100 described with reference to FIGS. 12 and 13 has been disclosed without a recharge circuit, alternative embodiments of the cascade system 1100 may include a recharge circuit such as the recharge circuit depicted in FIG. 5A including the recharge line 536. So configured, the manifold 1104 of the cascade system 1100 depicted in FIG. 12 would include recharge passageways similar to recharge passageways 540 depicted in FIG. 10C, for example. Moreover, when equipped with a recharge circuit, the check valve ports 1116*a-d* of the manifold 1104 of the cascade system 1100 depicted in FIG. 12 may accommodate dual check valves such as the dual check valve 600 depicted in FIG. 11.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fluid dispensing system, comprising:
    a manifold defining a first fluid passageway adapted to be connected in fluid communication with a fluid supply container, a second fluid passageway, and an outlet port in fluid communication with the second fluid passageway, the outlet port adapted to be connected in fluid communication with a fluid storage container; and
    a valve coupled to the manifold and comprising:
        a valve element adapted for displacement along a longitudinal axis between an open position and a closed position for controlling the flow of fluid from the first fluid passageway of the manifold to the outlet port of the manifold,
        a valve inlet passageway disposed inside of the manifold and in direct fluid communication with the first fluid passageway of the manifold,
        a valve outlet passageway disposed inside of the manifold and in direct fluid communication with the second fluid passageway of the manifold,
        a first pressure sensing passageway adapted to be in fluid communication with the fluid supply container for communicating a first pressure to a first pressure sensing surface of the valve element, and
        a second pressure sensing passageway adapted to be in fluid communication with the fluid storage container for communicating a second pressure to a second pressure sensing surface of the valve element.

2. The system of claim 1, wherein the first pressure sensing passageway of the valve is disposed within the manifold.

3. The system of claim 1, wherein the second pressure sensing passageway of the valve is disposed within the manifold.

4. The system of claim 1, wherein the first and second pressure sensing passageways are disposed within the manifold.

5. The system of claim 1, wherein the valve inlet passageway of the valve is disposed at an angle of less than 90° relative to the longitudinal axis of displacement of the valve element.

6. The system of claim 1, further comprising a valve seat disposed within the valve and adapted to be engaged by the valve element when the valve element is in the closed position.

7. The system of claim 6, further comprising a spring disposed within the valve and biasing the valve element into the open position.

8. The system of claim 7, wherein the valve inlet passageway of the valve is in fluid communication with the valve seat at a location that is disposed opposite the valve seat from the spring.

9. The system of claim 1, further comprising a regulator connected in fluid communication with the outlet port of the manifold.

10. A fluid dispensing system, comprising:
    a manifold defining a plurality of valve openings, each valve opening having an associated first fluid passageway adapted to be connected in fluid communication with one of a plurality of fluid supply containers, and a second fluid passageway adapted to be connected in fluid communication with a fluid storage container; and a plurality of valves, each valve disposed within one of the plurality of valve openings in the manifold and comprising:
- a valve seat,
- a valve element comprising a seating surface, the valve element adapted for displacement along a longitudinal axis between a closed position, wherein the seating surface engages the valve seat, and an open position, wherein the seating surface is spaced from the valve seat,
- a valve inlet passageway disposed inside of the manifold and in fluid communication with the first fluid passageway,
- a valve outlet passageway disposed inside of the manifold and in fluid communication with the second fluid passageway,
- a first pressure sensing passageway adapted to be in fluid communication with the one of the plurality of fluid supply containers for communicating a first pressure to a first pressure sensing surface of the valve element, and
- a second pressure sensing passageway adapted to be in fluid communication with the fluid storage container for communicating a second pressure to a second pressure sensing surface of the valve element.

11. The system of claim 10, wherein the first pressure sensing passageway of each valve is disposed within the manifold.

12. The system of claim 10, wherein the second pressure sensing passageway of each valve is disposed within the manifold.

13. The system of claim 10, wherein the first and second pressure sensing passageways of each valve are disposed within the manifold.

14. The system of claim 10, wherein the valve inlet passageway of each valve is disposed at an angle less than 90° relative to the longitudinal axis of displacement of the valve element.

15. The system of claim 10, further comprising a spring disposed within each valve and biasing the valve element into the open position.

16. The system of claim 10, wherein the valve inlet passageway of each valve is in fluid communication with the valve seat at a location that is disposed opposite the valve seat from the seating surface of the valve element.

17. A valve for use in a fluid dispensing system that includes a plurality of fluid supply containers coupled to a manifold for filling a fluid storage container, the valve comprising:
- a base defining a base cavity and an outer surface;
- a valve seat carried by the base and disposed within the base cavity;
- a valve element disposed within the base cavity and comprising a seating surface, the valve element adapted for displacement along a longitudinal axis between a closed position, wherein the seating surface engages the valve seat, and an open position, wherein the seating surface is spaced from the valve seat;
- a valve inlet passageway extending from the outer surface of the base into the base cavity at an angle less than 90° relative to the longitudinal axis of displacement of the valve element such that the valve inlet passageway is disposed in fluid communication with the valve seat at a location opposite the seating surface of the valve element;
- a valve outlet passageway extending from the base cavity to the outer surface of the base and adapted to be connected in fluid communication with the fluid storage container;
- a first pressure sensing passageway extending from the outer surface of the base into the base cavity and adapted to be in fluid communication with one of the fluid supply containers for communicating a first pressure to a first pressure sensing surface of the valve element; and
- a second pressure sensing passageway extending from the outer surface of the base into the base cavity and adapted to be in fluid communication with the fluid storage container for communicating a second pressure to a second pressure sensing surface of the valve element.

18. The valve of claim 17, further comprising a spring biasing the valve element into the open position.

* * * * *

UNITED STATES PATENT AND TRADEMARK OFFICE
CERTIFICATE OF CORRECTION

| | | |
|---|---|---|
| PATENT NO. | : 7,905,252 B2 | Page 1 of 1 |
| APPLICATION NO. | : 12/136188 | |
| DATED | : March 15, 2011 | |
| INVENTOR(S) | : Eric W. Neumann et al. | |

It is certified that error appears in the above-identified patent and that said Letters Patent is hereby corrected as shown below:

In the Specification:

At Column 3, line 36, "be low" should be -- below --.

Signed and Sealed this
Twenty-seventh Day of December, 2011

David J. Kappos
*Director of the United States Patent and Trademark Office*